(12) United States Patent
Neuman et al.

(10) Patent No.: US 9,884,471 B2
(45) Date of Patent: Feb. 6, 2018

(54) BIODEGRADABLE SHEET AND AN ARRAY OF SEPARABLE POUCHES FOR LIQUIDS

(71) Applicant: Tipa Corp. LTD, Hod Hasharon (IL)

(72) Inventors: Tal Neuman, Ramot Ha'shavim (IL); Daphna Nissenbaum, Ramot Ha'shavim (IL); Ana Lea Dotan, Ramat-Gan (IL); Noam Tenenbaum, Kadima (IL); Shai Garty, Rehovot (IL)

(73) Assignee: Tipa Corp. Ltd., Hod Hasharon (IL)

( * ) Notice: Subject to any disclaimer, the term of this patent is extended or adjusted under 35 U.S.C. 154(b) by 0 days.

(21) Appl. No.: 14/641,747

(22) Filed: Mar. 9, 2015

(65) Prior Publication Data

US 2015/0175759 A1 Jun. 25, 2015

Related U.S. Application Data

(63) Continuation-in-part of application No. 13/703,973, filed as application No. PCT/IL2011/000481 on Jun. 16, 2011, now Pat. No. 9,228,079.
(Continued)

(30) Foreign Application Priority Data

Jun. 17, 2010 (IL) .......................................... 206463
Nov. 4, 2010 (IL) .......................................... 209143

(51) Int. Cl.
*B32B 27/36* (2006.01)
*C08L 67/00* (2006.01)
(Continued)

(52) U.S. Cl.
CPC ................ *B32B 27/36* (2013.01); *B32B 1/02* (2013.01); *B32B 27/08* (2013.01); *B65D 65/466* (2013.01);
(Continued)

(58) Field of Classification Search
CPC .... B32B 1/02; B32B 27/36; C08J 5/18; C08L 67/02; Y10T 428/1352; Y10T 428/31786
See application file for complete search history.

(56) References Cited

U.S. PATENT DOCUMENTS

| | | | |
|---|---|---|---|
| 5,044,512 A | 9/1991 | Giancaspro et al. | |
| 5,506,046 A | 4/1996 | Andersen et al. | |

(Continued)

FOREIGN PATENT DOCUMENTS

| | | |
|---|---|---|
| CN | 104364081 | 2/2015 |
| JP | 2001-088261 | 4/2001 |

(Continued)

OTHER PUBLICATIONS

Steeves DM et al. "Investigation of polybutylene succinate-co-adipate (PBSA)/monomorillonite layered silicate (MLS) melt-processed nanocomposites" Journal of Biobased Materials and Bioenergy, vol. 1, No. 1, pp. 94-108, ISSN 1556-6560, Apr. 30, 2007.
(Continued)

*Primary Examiner* — Walter B Aughenbaugh
(74) *Attorney, Agent, or Firm* — Pearl Cohen Zedek Latzer Baratz LLP

(57) ABSTRACT

Disclosed is a biodegradable sheet prepared from biodegradable material, a process for preparing the biodegradable sheet and uses thereof. One of the disclosed uses of the biodegradable sheet is in the preparation of a flexible liquid receptacle. Disclosed also is a flexible liquid receptacle arranged as an array of several receptacle units that are attached to one another and that may be detached from one another by tearing along a perforated line created between each two receptacle units. The disclosed array may also include a hanger, thus allowing the array to be hung from any appropriate means. Further disclosed is a biodegradable (Continued)

sheet including at least one layer comprising about 15-25% w/w PLA and about 75-85% w/w PBSA.

10 Claims, 25 Drawing Sheets

Related U.S. Application Data

(60) Provisional application No. 61/471,453, filed on Apr. 4, 2011.

(51) Int. Cl.
| | | |
|---|---|---|
| *B32B 27/08* | (2006.01) | |
| *B65D 65/46* | (2006.01) | |
| *B65D 75/42* | (2006.01) | |
| *B65D 75/58* | (2006.01) | |
| *C08J 5/18* | (2006.01) | |
| *B32B 1/02* | (2006.01) | |
| *B65D 85/72* | (2006.01) | |
| *C08L 67/02* | (2006.01) | |
| *C08L 67/04* | (2006.01) | |

(52) U.S. Cl.
CPC ......... *B65D 75/42* (2013.01); *B65D 75/5822* (2013.01); *B65D 75/5883* (2013.01); *B65D 85/72* (2013.01); *C08J 5/18* (2013.01); *C08L 67/00* (2013.01); *C08L 67/02* (2013.01); *C08L 67/04* (2013.01); *B32B 2250/03* (2013.01); *B32B 2250/244* (2013.01); *B32B 2250/40* (2013.01); *B32B 2270/00* (2013.01); *B32B 2307/558* (2013.01); *B32B 2307/7163* (2013.01); *B32B 2439/00* (2013.01); *B32B 2439/40* (2013.01); *C08J 2367/02* (2013.01); *C08J 2367/04* (2013.01); *C08J 2467/04* (2013.01); *Y02W 90/12* (2015.05); *Y02W 90/13* (2015.05); *Y10T 428/1397* (2015.01); *Y10T 428/31786* (2015.04)

(56) References Cited

U.S. PATENT DOCUMENTS

| | | | |
|---|---|---|---|
| 5,756,194 A | 5/1998 | Shogren et al. | |
| 5,883,199 A | 3/1999 | McCarthy et al. | |
| 5,910,545 A * | 6/1999 | Tsai | A61F 13/15252 |
| | | | 525/178 |
| 6,372,331 B1 * | 4/2002 | Terada | B32B 27/36 |
| | | | 428/212 |
| 6,422,753 B1 | 7/2002 | Thomas | |
| 7,956,101 B2 | 6/2011 | Grossman | |
| 8,420,746 B2 | 4/2013 | Huang et al. | |
| 8,513,144 B2 | 8/2013 | Ting et al. | |
| 2002/0052445 A1 * | 5/2002 | Terada | C08J 5/18 |
| | | | 525/185 |
| 2003/0039775 A1 | 2/2003 | Kong | |
| 2004/0065703 A1 | 4/2004 | Bellucci | |
| 2004/0068059 A1 * | 4/2004 | Katayama | C08G 18/4277 |
| | | | 525/466 |
| 2005/0172812 A1 | 8/2005 | Ueda et al. | |
| 2005/0244606 A1 | 11/2005 | Egawa | |
| 2005/0288452 A1 | 12/2005 | Wakaki et al. | |
| 2007/0191527 A1 | 8/2007 | Mallikarjuna et al. | |
| 2008/0090923 A1 | 4/2008 | Gano | |
| 2008/0128382 A1 | 6/2008 | Yamamoto et al. | |
| 2008/0147034 A1 | 6/2008 | Wang et al. | |
| 2009/0098395 A1 | 4/2009 | Lu et al. | |
| 2009/0162683 A1 | 6/2009 | Douard | |
| 2010/0249332 A1 | 9/2010 | Ferguson | |
| 2011/0135912 A1 | 6/2011 | Xu | |
| 2011/0171461 A1 | 7/2011 | Sanfilippo et al. | |
| 2012/0034444 A1 | 2/2012 | Chen et al. | |
| 2013/0087560 A1 | 4/2013 | Neuman et al. | |
| 2014/0329039 A1 | 11/2014 | Neuman et al. | |

FOREIGN PATENT DOCUMENTS

| | | |
|---|---|---|
| JP | 2005 154524 | 6/2005 |
| JP | 2005154524 | 6/2005 |
| JP | 2006-206670 | 8/2006 |
| WO | WO 2001/087566 | 11/2001 |
| WO | WO 2003/055792 | 7/2003 |
| WO | WO-2005/063881 | 7/2005 |
| WO | WO 2008/157158 | 12/2008 |
| WO | WO 2009/073197 | 6/2009 |
| WO | WO 2009/098463 | 8/2009 |
| WO | WO 2011/054892 | 5/2011 |
| WO | WO 2011/110750 | 9/2011 |
| WO | WO 2011/123682 | 10/2011 |
| WO | WO 2011/158240 | 12/2011 |
| WO | WO 2013/088443 | 6/2013 |
| WO | WO 2013/186778 | 12/2013 |
| WO | WO 2015/059709 | 4/2015 |

OTHER PUBLICATIONS

European Search Report for EP App. No. EP 15 18 3507, dated May 18, 2016.

* cited by examiner

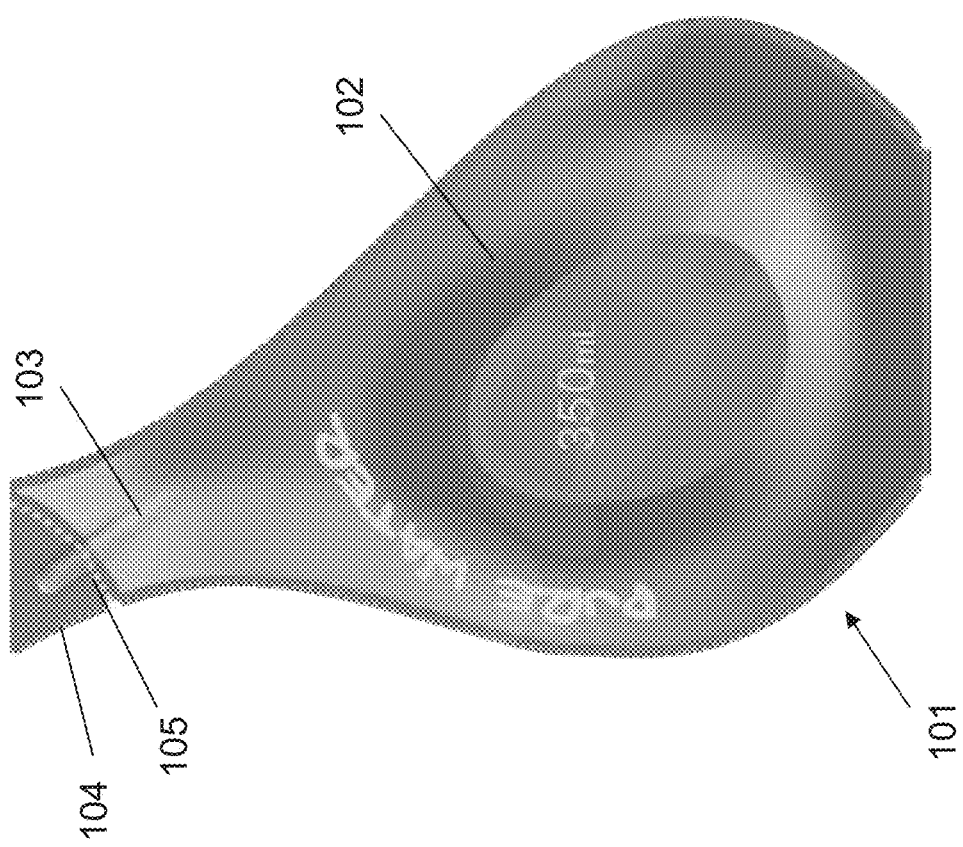

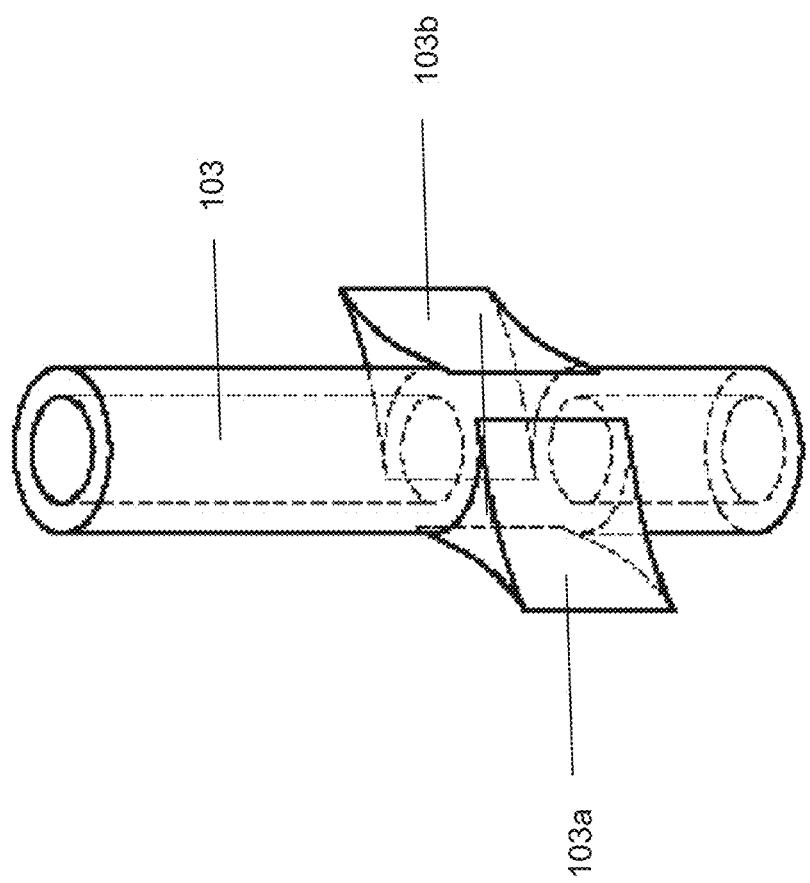

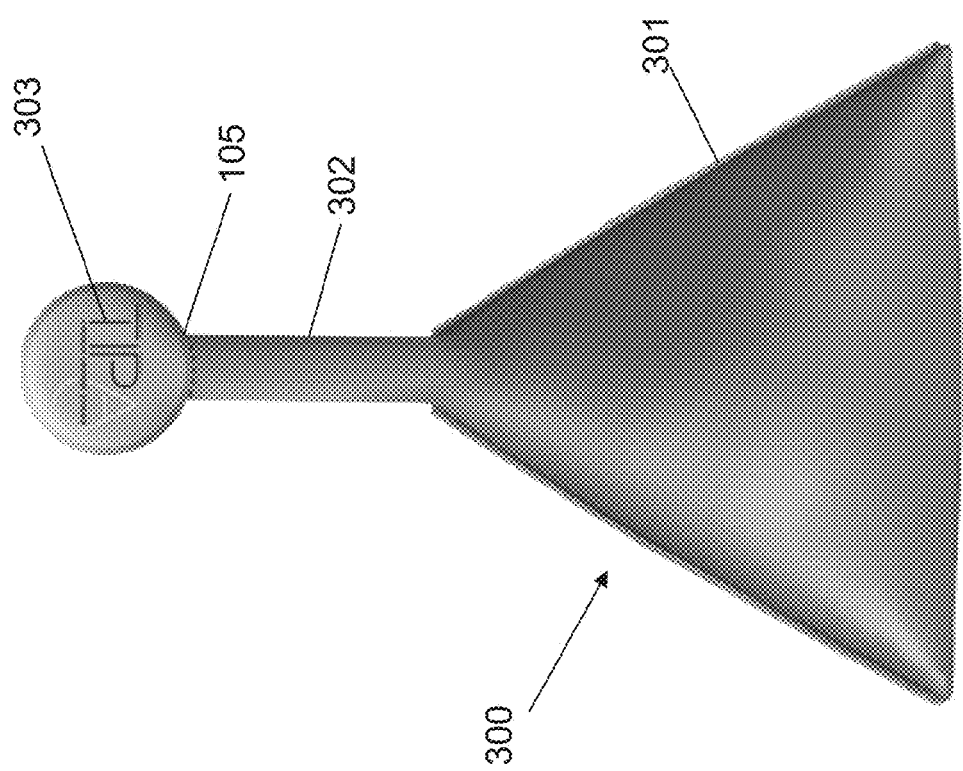

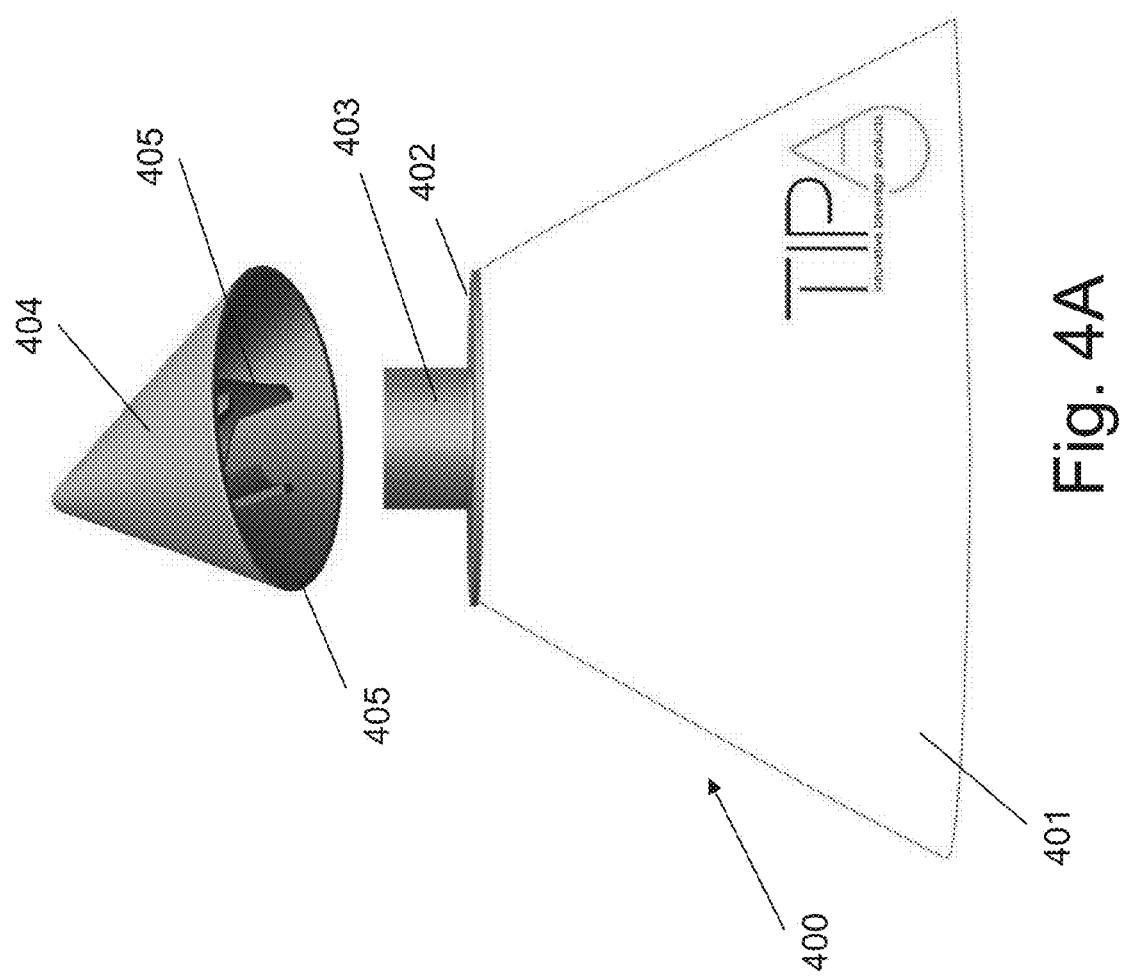

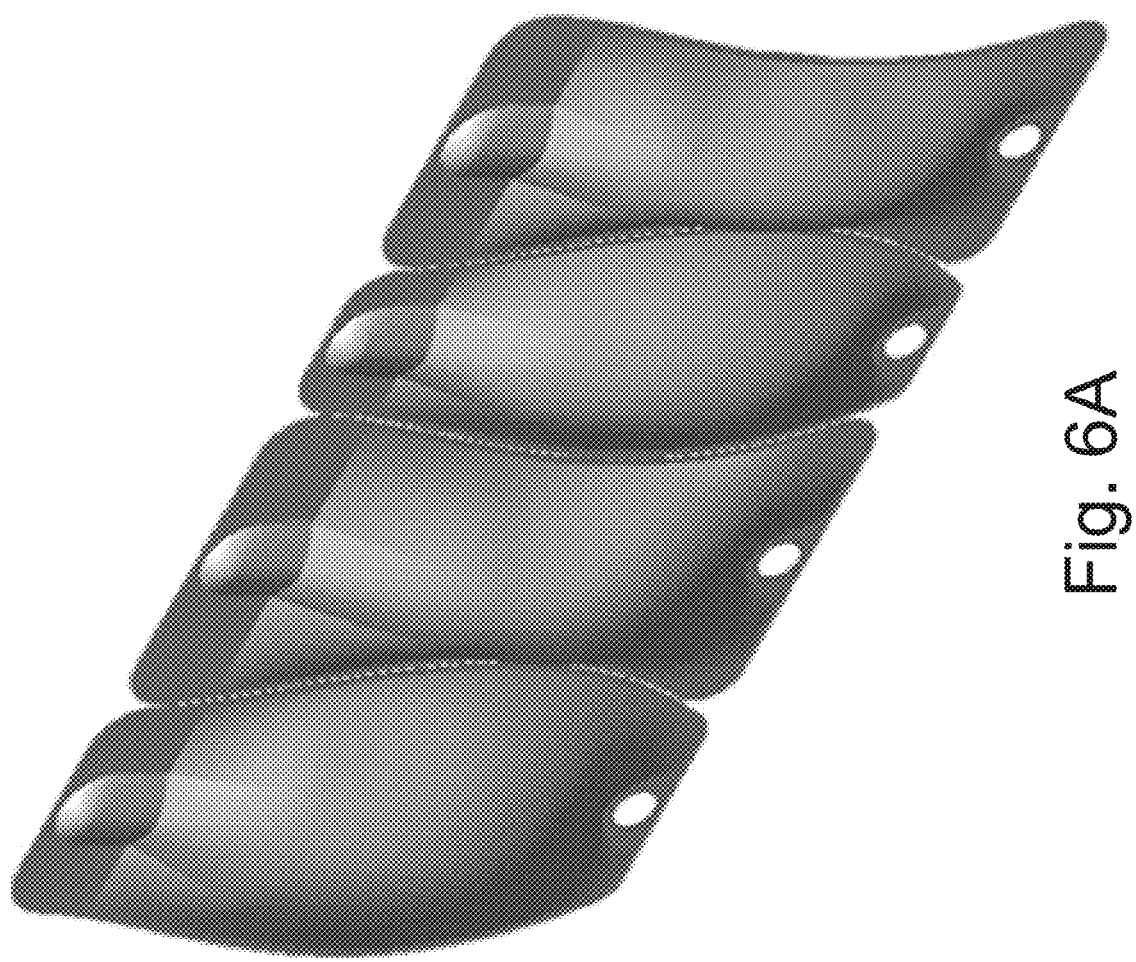

BIODEGRADABLE SHEET AND AN ARRAY OF SEPARABLE POUCHES FOR LIQUIDS

CROSS REFERENCE TO RELATED APPLICATIONS

This application is a continuation-in-part of U.S. patent application Ser. No. 13/703,973, filed Dec. 13, 2012, which is a National Phase application of PCT International Application No. PCT/IL2011/000481, International Filing Date Jun. 16, 2011, entitled "BIODEGRADABLE SHEET AND AN ARRAY OF SEPARABLE POUCHES FOR LIQUIDS", published on Dec. 22, 2011, as International Publication No. WO 2011/158240, which claims priority from Israeli Patent Application No. 206463, filed Jun. 17, 2010, and from Israeli Patent Application No. 209143, filed on Nov. 4, 2010, and from U.S. Provisional Patent Application No. 61/471,453, filed on Apr. 4, 2011, all of which are incorporated herein by reference in their entirety.

FIELD OF THE INVENTION

This invention is directed to a composition for biodegradable sheets and to a flexible liquid receptacle. The biodegradable sheets of the invention are inherently impermeable to gas and liquid and may further include a barrier. The invention is further directed to a process for preparing such biodegradable sheets and uses thereof, particularly in the preparation of liquid receptacles. In addition, the invention relates to a separable array of biodegradable liquid receptacles that have a plurality of individual liquid receptacles that can be torn-off from the package. The invention is further directed to a biodegradable polymeric sheet including at least one layer comprising about 15-25% w/w PLA and about 75-85% w/w PBSA.

BACKGROUND OF THE INVENTION

The use of biodegradable materials has grown over the past years due to the biodegradable materials' environmentally friendly properties. The use of such materials is widespread and includes various types of plastic bags, diapers, balloons and even sunscreen. In response to the demand for more environmentally friendly packaging materials, a number of new biopolymers have been developed that have been shown to biodegrade when discarded into the environment. Some of the larger players in the biodegradable plastics market include such well-known chemical companies as DuPont, BASF, Cargill-Dow Polymers, Union Carbide, Bayer, Monsanto, Mitsui and Eastman Chemical. Each of these companies has developed one or more classes or types of biopolymers. For example, both BASF and Eastman Chemical have developed biopolymers known as "aliphatic-aromatic" copolymers, sold under the trade names ECOFLEX and EASTAR BIO, respectively. Bayer has developed polyesteramides under the trade name BAK. Du Pont has developed BIOMAX, a modified polyethylene terephthalate (PET). Cargill-Dow has sold a variety of biopolymers based on polylactic acid (PLA). Monsanto developed a class of polymers known as polyhydroxyalkanoates (PHA), which include polyhydroxybutyrates (PHB), polyhydroxyvalerates (PHV), and polyhydroxybutyrate-hydroxyvalerate copolymers (PHBV). Union Carbide manufactures polycaprolactone (PCL) under the trade name TONE.

Each of the foregoing biopolymers has unique properties, benefits and weaknesses. For example, biopolymers such as BIOMAX, BAK, PHB and PLA tend to be strong but are also quite rigid or even brittle. This makes them poor candidates when flexible sheets or films are desired, such as for use in making wraps, bags and other packaging materials requiring good bend and folding capability. In the case of BIOMAX, DuPont does not presently provide specifications or conditions suitable for blowing films therefrom, thus indicating that it may not be presently believed that films can be blown from BIOMAX and similar polymers.

On the other hand, biopolymers such as PHBV, ECOFLEX and EASTAR BIO are many times more flexible compared to the more rigid biopolymers discussed above. However, they have relatively low melting points such that they tend to be self adhering and unstable when newly processed and/or exposed to heat. To prevent self-adhesion (or "blocking") of such films, it is typically necessary to incorporate a small amount (e.g. 0.15% by weight) of silica, talc or other fillers.

Further, due to the limited number of biodegradable polymers, it is often difficult, or even impossible, to identify one single polymer or copolymer that meets all, or even most, of the desired performance criteria for a given application. For these and other reasons, biodegradable polymers are not as widely used in the area of food packaging materials, particularly in the field of liquid receptacles, as desired for ecological reasons.

In addition, the biodegradable sheets known today are mostly opaque, having low light transmittance and high haze. Further, the known biodegradable sheets either do not include barriers or include amounts and types of barriers that cause the sheets to be generally highly permeable to gases, having both a high oxygen transmission rate and a high water vapor transmission rate, and thus they cannot serve as long term food or drink receptacles. Additionally, the physical strength of known biodegradable sheets, measured by parameters such as stress at maximum load, strain at break and Young's Modulus, is lacking and, therefore, is deficient when used as packaging, particularly when it is desirable to package liquids.

Therefore, there is a need in the art for a biodegradable sheet that is physically strong, though flexible, and further, has low gas permeability, a high light transmittance and low haze. Such a biodegradable sheet could be used as a long term receptacle.

Further, although many liquid receptacles are used in the food and drink industry, biodegradable receptacles are not widely used. U.S. Pat. No. 6,422,753 discloses a separable beverage receptacle packaging for potable and freezable liquids, wherein the packaging comprises a plurality of individual beverage receptacle units aligned in a side by side fashion relative to one another. Each beverage receptacle unit has an interior fluid chamber defined by a lower heat weld, an upper heat weld and two vertical heat welds that are formed on opposed sheets of plastic. The heat welds between the intermediate beverage receptacle units are provided with perforated strips and the upper end of each receptacle unit is provided with an upper horizontal heat weld disposed above a tapered crimp with a gap that defines an integral drinking solubility spout when the tear strip above the perforated line is removed from the individual beverage receptacle units. However, this packaging is not environmental friendly.

U.S. Pat. No. 5,756,194 discloses water-resistant starch products useful in the food industry that comprise an inner core of gelatinized starch, an intermediate layer of natural resin and an outer layer of water resistant biodegradable polyester. The gelatinized starch can be made water-resistant by coating with biodegradable polyesters such as poly(betahydroxybutyrate-co-valerate) (PHBV), poly(lactic acid) (PLA), and poly(.di-elect cons.-caprolactone) (PCL). Adherence of the two dissimilar materials is achieved through the use of an intervening layer of a resinous material such as shellac or rosin which possesses a solubility parameter (hydrophobicity) intermediate to that of the starch and the polyesters. Coating is achieved by spraying an alcoholic solution of the shellac or rosin onto the starch-based article and subsequently coating with a solution of the polyester in an appropriate solvent. However, these products are not optimally designed for allowing a user to carry them easily while being in a physical activity. In addition, they are not designed to provide different liquid volumes that can be consumed according to instant needs.

All of the aforementioned prior art constructions are deficient with respect to their failure to provide a simple, efficient, and practical packaging arrangement for liquids that will provide the user with easy access to flexible compartmented packaging for liquids. Consequently, there is a need for a new and improved type of a biodegradable liquid receptacle.

SUMMARY OF THE INVENTION

This invention is directed to a biodegradable sheet having a stress at maximum load of at least 15 MPa, a strain at break of at least 300% and a Young's Modulus of at least 200 MPa. This invention is further directed to a biodegradable sheet having a stress at maximum load of at least 15 MPa, a strain at break of at least 300% and a Young's Modulus of at least 200 MPa for preparing a liquid receptacle.

Additionally, this invention is directed to a method of preparing a liquid receptacle comprising the step of using a biodegradable sheet having a stress at maximum load of at least 15 MPa, a strain at break of at least 300% and a Young's Modulus of at least 200 MPa.

This invention is further directed to a single layered biodegradable sheet comprising PLA and PBS at a w/w ratio of between 2:1 and 0.5:1. Additionally, this invention is directed to a multi-layered biodegradable sheet comprising the three layers, wherein the outer layers are identical and include: PLA, PBS and Ecoflex at a w/w ratio of between 2:1 and 0.5:1 or PLA, PBSA and PBAT at a w/w ratio of between 2:1 and 0.5:1 and the inner layer includes 100% w/w PHA or PBAT.

In addition, this invention is directed to a single layer biodegradable sheet or the multi-layered biodegradable sheet for the preparation of a liquid receptacle.

The invention is further directed to a separable beverage receptacle packaging comprising a plurality of receptacle units separated from one another by a perforated line, wherein each receptacle unit comprises a compartment for storing liquids and a means by which the liquids are removed therefrom.

Additionally, the invention is directed to a receptacle unit interchangeably referred to herein as a pouch prepared from the biodegradable sheet of the invention comprising a compartment for storing liquids and a means by which the liquids are removed therefrom.

Further embodiments of the invention are directed to a biodegradable polymeric sheet including at least one layer comprising about 15-25% w/w PLA and about 75-85% w/w PBSA. Additional embodiments are directed to a biodegradable polymeric sheet including at least one layer comprising about 15% w/w PLA and about 85% w/w PBSA. Additional embodiments are directed to a biodegradable polymeric sheet including at least one layer comprising about 20% w/w PLA and about 80% w/w PBSA. Additional embodiments are directed to a biodegradable polymeric sheet including at least one layer comprising about 25% w/w PLA and about 75% w/w PBSA.

According to some embodiments, the biodegradable polymeric sheet is a single layer sheet comprising about 15-25% w/w PLA and about 75-85% w/w PBSA. According to some embodiments, the biodegradable polymeric sheet comprises at least two layers, wherein at least one layer comprises about 15-25% w/w PLA and about 75-85% w/w PBSA. According to some embodiments, the sheet is a multi-layer sheet comprising at least three layers, wherein at least one layer is an internal layer comprising about 15-25% w/w PLA and about 75-85% w/w PBSA. According to some embodiments, the sheet is a multi-layer sheet, wherein at least one layer is an external layer comprising about 15-25% w/w PLA and about 75-85% w/w PBSA.

Some embodiments are directed to a receptacle comprising a biodegradable polymeric sheet including at least one layer comprising about 15-25% w/w PLA and about 75-85% w/w PBSA. According to some embodiments, the receptacle comprises at least one outer layer and at least one inner layer, wherein at least one inner layer and/or at least one outer layer comprises about 15-25% w/w PLA and about 75-85% w/w PBSA. According to some embodiments, the receptacle includes at least one inner layer and at least one outer layer comprising about 15-25% w/w PLA and about 75-85% w/w PBSA.

BRIEF DESCRIPTION OF THE DRAWINGS

The above and other characteristics and advantages of the invention will be better understood through the following illustrative and non-limitative detailed description of preferred embodiments thereof, with reference to the appended drawings, wherein:

FIG. 2A illustrates the layout of a single receptacle units, according to an embodiment of the invention;

FIG. 2D illustrates the layout of an internal straw segment, according to an embodiment of the invention;

FIGS. 3A to 3F illustrate the layout of an array of six receptacle units, according to an embodiment of the invention;

FIGS. 4A to 4C illustrate the layout of a single receptacle units with a mating cover, according to another embodiment of the invention;

FIGS. 6A-D illustrate an array of four receptacle units, according to an embodiment of the invention, wherein all of the receptacle units are closed (FIG. 6A is an overview of the array, FIG. 6B is a front view of the array, FIG. 6C is a side view of the array and FIG. 6D is a top view of the array);

FIG. 7C is a side view of the array and FIG. 7D is a top view of the array);

DETAILED DESCRIPTION OF THE INVENTION

Figure 1:
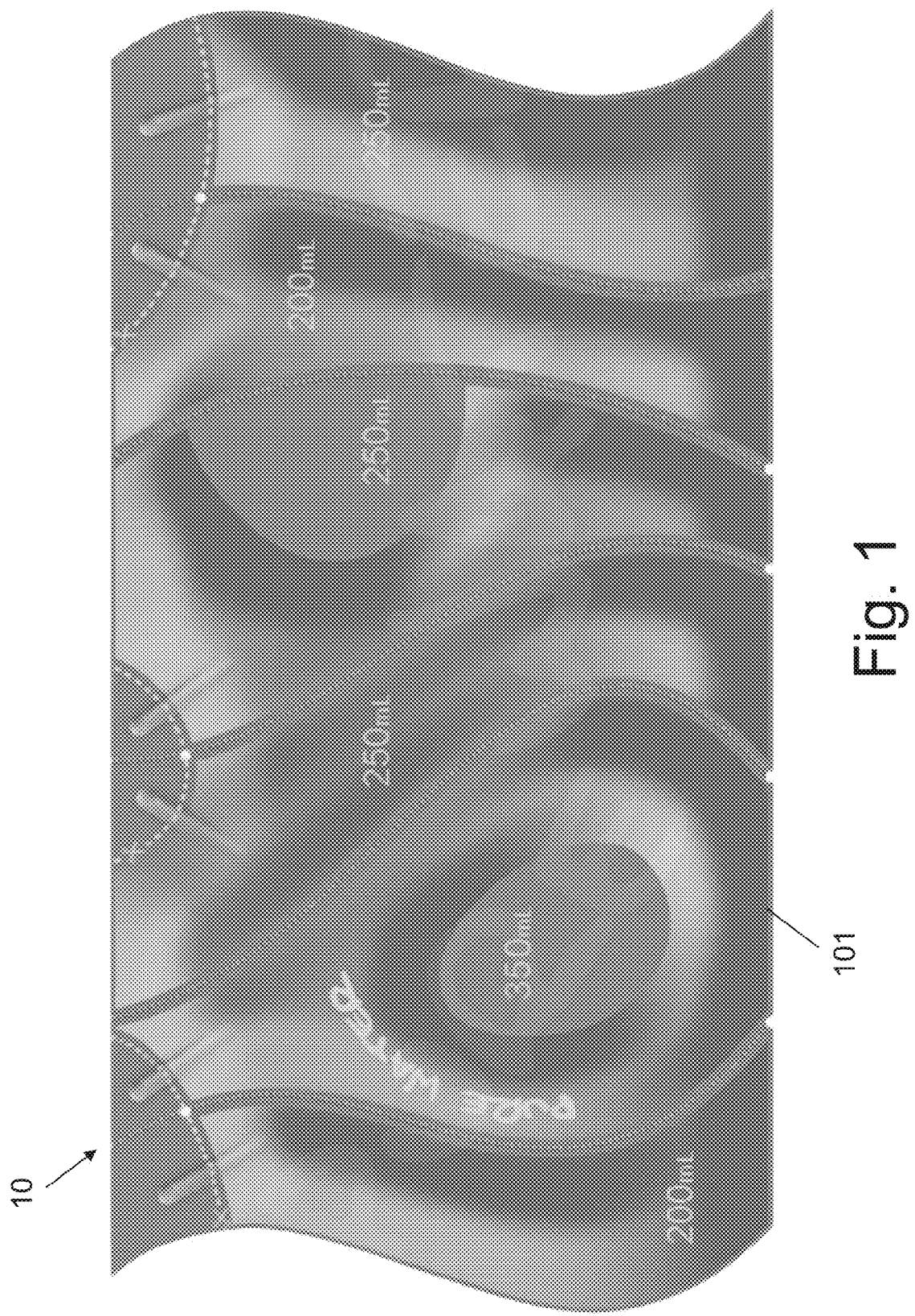
FIG. 1 illustrates the construction of an array of receptacle units of different volume, according to an embodiment of the invention.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The term "biodegradable" as used herein is to be understood to include any polymers that degrade through the action of living organisms, light, air, water or any combinations thereof. Such biodegradable polymers include various synthetic polymers, such as polyesters, polyester amides, polycarbonates, etc. Naturally-derived semi-synthetic polyesters (e.g., from fermentation) may also be included in the term "biodegradable". Biodegradation reactions are typically enzyme-catalyzed and generally occur in the presence of moisture. Natural macromolecules containing hydrolyzable linkages, such as protein, cellulose and starch, are generally susceptible to biodegradation by the hydrolytic enzymes of microorganisms. A few man-made polymers, however, are also biodegradable. The hydrophilic/hydrophobic character of polymers greatly affects their biodegradability, with more polar polymers being more readily biodegradable as a general rule. Other important polymer characteristics that affect biodegradability include crystallinity, chain flexibility and chain length.

The term "sheet" as used herein is to be understood as having its customary meanings as used in the thermoplastic and packaging arts. The biodegradable compositions according to the invention can be used to manufacture a wide variety of articles of manufacture, including articles useful to package solid and liquid substances, including food substances. Thus, the sheets according to this invention include sheets having a wide variety of thicknesses (both measured and calculated).

The term "about" as used herein is to be understood to refer to a 10% deviation in the value related to.

The terms "particle" or "particulate filler" should be interpreted broadly to include filler particles having any of a variety of different shapes and aspect ratios. In general, "particles" are those solids having an aspect ratio (i.e., the ratio of length to thickness) of less than about 10:1. Solids having an aspect ratio greater than about 10:1 may be better understood as "fibers", as that term will be defined and discussed herein below.

The term "fibers" should be interpreted as a solid having an aspect ratio greater than at least about 10:1. Therefore, fibers are better able to impart strength and toughness than particulate fillers. As used herein, the terms "fibers" and "fibrous material" include both inorganic fibers and organic fibers.

Besides being able to biodegrade, it is often important for a polymer or polymer blend to exhibit certain physical properties. The intended application of a particular polymer blend will often dictate which properties are necessary in order for a particular polymer blend, or article manufactured there from, to exhibit the desired performance criteria. When relating to biodegradable sheets for use as packaging materials, particularly as liquid receptacles, desired performance criteria may include strain at break, Young's modulus and stress at maximum load.

In order to define the physical properties of the biodegradable sheets of this invention, several measurements were used. Stress at maximum load, Young's Modulus and the strain at break were measured using the ASTM D882-10 Standard Test Method for Tensile Properties of Thin Plastic Sheeting. The light transmittance and the haze were measured using the ASTM D1003-07e1 Standard Test Method for Haze and Luminous Transmittance of Transparent Plastics. The oxygen permeability of the biodegradable sheets was measured using the ASTM D3985-05(2010)e1 Standard Test Method for Oxygen Gas Transmission Rate Through Plastic Film and Sheeting Using a Coulometric Sensor. The water vapor permeability of the biodegradable sheets of the invention was measured using the ASTM E398-03(2009)e1 Standard Test Method for Water Vapor Transmission Rate of Sheet Materials Using Dynamic Relative Humidity Measurement.

In an embodiment of the invention, this invention provides a biodegradable sheet having a stress at maximum load of at least 15 MPa. According to other embodiments, this invention provides a biodegradable sheet having a stress at maximum load of at least 30 MPa. According to some embodiments of the invention, the stress at maximum load is in the range of 15-50 MPa. According to some embodiments of the invention, the stress at maximum load is in the range of 15-20 M Pa. According to some embodiments of the invention, the stress at maximum load is in the range of 20-25 MPa. According to some embodiments of the invention, the stress at maximum load is in the range of 25-30 MPa. According to some embodiments of the invention, the stress at maximum load is in the range of 30-35 MPa. According to some embodiments of the invention, the stress at maximum load is in the range of 35-40 MPa. According to some embodiments of the invention, the stress at maximum load is in the range of 40-45 MPa. According to some embodiments of the invention, the stress at maximum load is in the range of 45-50 MPa. According to further embodiments of the invention, the stress at maximum load is in the range of 24-26 MPa. According to further embodiments of the invention, the stress at maximum load is in the range of 46-48 MPa. According to further embodiments of the invention, the stress at maximum load is in the range of 32-34 MPa. According to some embodiments of the invention, the stress at maximum load is in the range of 19-21 MPa. According to some embodiments of the invention, the stress at maximum load is in the range of 29-31 MPa.

The biodegradable sheet of this invention has a strain at break of at least 280%. According to further embodiments, the strain at break is at least 300%. According to some embodiments, the strain at break is in the range of 400-600%. According to some embodiments, the strain at break is in the range of 280-850%. According to some embodiments, the strain at break is in the range of 280-350%. According to further embodiments, the strain at break is in the range of 350-450%. According to further embodiments, the strain at break is in the range of 450-550%. According to further embodiments, the strain at break is in the range of 550-650%. According to further embodiments, the strain at break is in the range of 650-750%. According to further embodiments, the strain at break is in the range of 750-850%. According to further embodiments, the strain at break is in the range of 410-420%. According to further embodiments, the strain at break is in the range of 725-735%. According to further embodiments, the strain at break is in the range of 575-585%. According to further embodiments, the strain at break is in the range of 555-565%. According to further embodiments, the strain at break is in the range of 615-625%.

The Young's Modulus of the biodegradable sheet of this invention is at least 200 MPa. According to some embodiments of the invention, Young's Modulus is in the range of 200-800 MPa. According to further embodiments of the invention, Young's Modulus is in the range of 400-600 MPa. According to further embodiments, Young's Modulus is in the range of 300-350 MPa. According to further embodiments, Young's Modulus is in the range of 350-400 MPa. According to further embodiments, Young's Modulus is in the range of 400-450 MPa. According to further embodiments, Young's Modulus is in the range of 450-500 MPa. According to further embodiments, Young's Modulus is in the range of 500-550 MPa. According to further embodiments, Young's Modulus is in the range of 550-600 MPa. According to further embodiments, Young's Modulus is in the range of 600-650 MPa. According to further embodiments, Young's Modulus is in the range of 650-700 MPa. According to further embodiments, Young's Modulus is in the range of 700-750 MPa. According to further embodiments, Young's Modulus is in the range of 750-800 MPa. According to further embodiments, Young's Modulus is in the range of 675-685 MPa. According to further embodiments, Young's Modulus is in the range of 565-575 MPa. According to further embodiments, Young's Modulus is in the range of 600-610 MPa. According to further embodiments, Young's Modulus is in the range of 670-680 MPa. According to further embodiments, Young's Modulus is in the range of 385-395 MPa. According to some embodiments of the invention, the light transmittance of the biodegradable sheet of the invention is at least 75%. According to further embodiments, the light transmittance is in the range of 75-95%. According to further embodiments, the light transmittance is in the range of 75-80%. According to further embodiments, the light transmittance is in the range of 80-85%. According to further embodiments, the light transmittance is in the range of 85-90%. According to further embodiments, the light transmittance is in the range of 90-95%. According to further embodiments, the light transmittance is above 95%.

According to some embodiments of the invention, the oxygen transmission rate of the biodegradable sheet of the invention is lower than 8500 cc/m2/24 hours. According to further embodiments, the oxygen transmission rate is in the range of 100-130 cc/m2/24 hours. According to further embodiments, the oxygen transmission rate is in the range of 100-1000 cc/m2/24 hours. According to further embodiments, the oxygen transmission rate is in the range of 1000-2000 cc/m2/24 hours. According to further embodiments, the oxygen transmission rate is in the range of 2000-3000 cc/m2/24 hours. According to further embodiments, the oxygen transmission rate is in the range of 3000-4000 cc/m2/24 hours. According to further embodiments, the oxygen transmission rate is in the range of 4000-5000 cc/m2/24 hours. According to further embodiments, the oxygen transmission rate is in the range of 5000-6000 cc/m2/24 hours. According to further embodiments, the oxygen transmission rate is in the range of 6000-7000 cc/m2/24 hours. According to further embodiments, the oxygen transmission rate is in the range of 7000-8000 cc/m2/24 hours.

According to some embodiments of the invention, the water vapor transmission rate of the biodegradable sheet of the invention is lower than 30 gr/m2/day. According to further embodiments of the invention, the water vapor transmission rate is lower than 20 gr/m2/day. According to further embodiments, the water vapor transmission rate is in the range of 15-20 gr/m2/day. According to further embodiments, the water vapor transmission rate is in the range of 20-25 gr/m2/day. According to further embodiments, the water vapor transmission rate is in the range of 25-30 gr/m2/day.

The invention is further directed to a biodegradable sheet comprising any appropriate amounts of any appropriate biodegradable polymers, capable of providing the biodegradable sheet with the desired physical properties, as detailed above. According to some embodiments, the biodegradable sheet of the invention is recyclable, i.e., the material from which it is prepared may be reused (after appropriate treatment, i.e., cleaning when necessary, grinding, heating, etc.) to prepare additional articles of manufacture.

According to further embodiments, the biodegradable sheet of the invention is compostable.

According to some embodiments, the biodegradable sheet comprises synthetic polyesters, semi-synthetic polyesters made by fermentation (e.g., PHB and PHBV), polyester amides, polycarbonates, and polyester urethanes. In other embodiments the biodegradable sheet of the invention includes at least one of a variety of natural polymers and their derivatives, such as polymers comprising or derived from starch, cellulose, other polysaccharides and proteins.

According to some embodiments, the biodegradable sheet comprises polylactic acids (PLA) or derivatives thereof related to as CPLA, polybutylene succinate (PBS), polybutylene succinate adipate (PBSA), polyethylene succinate (PES), poly(tetramethylene-adipate-coterephthalate (PTAT), polyhydrozyalkanoates (PHA), poly(butylene adipate-co-terephthalate (PBAT), thermoplastic starch (TPS), polyhydroxyburates (PHB), polyhydroxyvalerates (PHV), polyhydroxybutyrate-hydroxyvalerate copolymers (PHBV), polycaprolactone (PCL), Ecoflex®, an aliphatic-aromatic copolymer, Eastar Bio®, another aliphatic-aromatic copolymer, Bak® comprising polesteramides, Biomax®, which is a modified polyethylene terephathalate, Novamont®, or any combination thereof.

According to some embodiments, the biodegradable sheet comprises polylactic acids (PLA) or derivatives thereof related to as CPLA and/or polybutylene succinate (PBS) together with any one of polybutylene succinate adipate (PBSA), polyethylene succinate (PES), poly(tetramethylene-adipate-coterephthalate (PTAT), polyhydrozyalkanoates (PHA), poly(butylene adipate-co-terephthalate (PBAT), thermoplastic starch (TPS), polyhydroxyburates (PHB), polyhydroxyvalerates (PHV), polyhydroxybutyrate-hydroxyvalerate copolymers (PHBV), polycaprolactone (PCL), Ecoflex®, an aliphatic-aromatic copolymer, Eastar Bio®, another aliphatic-aromatic copolymer, Bak® comprising polesteramides, Biomax®, which is a modified polyethylene terephathalate, Novamont®, or any combination thereof.

According to some embodiments, the PLA is a homopolymer. According to further embodiments, the PLA is copolymerized with glycolides, lactones or other monomers. One particularly attractive feature of PLA-based polymers is that they are derived from renewable agricultural products. Further, since lactic acid has an asymmetric carbon atom, it exists in several isomeric forms. The PLA used according to some embodiments of the invention includes poly-L-lactide, poly-D-lactide, poly-DL-lactide or any combination thereof.

According to some embodiments, the biodegradable sheet of the invention further comprises any appropriate additives. According to one embodiment, the additive softens the biodegradable polymer. The softeners used may be selected from the group comprising Paraloid®, Sukano®, tributyl acetyl citrate (A4®) or any combination thereof.

According to some embodiments, the biodegradable sheet of the invention comprises at least one nanoclay and/or at least one nano-composite. The addition of the nanoclay and/or the nano-composite lowers the water vapor transmission rate and the oxygen transmission rate of the biodegradable sheet of the invention, thus acting as barriers in the sheet. Further, according to certain embodiments of this invention, the nanoclays and the nano-composites added to the biodegradable sheet are naturally occurring materials, and therefore, the sheets remain biodegradable. According to one embodiment, montmorillonite, vermiculite or any combination thereof are added to the composition of the biodegradable sheet.

According to one embodiment, nanoclays based on montmorilonite with polar organophilic based surface treatment and/or nanoclays based on vermiculite, heat treated and polar organophilic base surface treated are added to the biodegradable composition in order to create a well dispersed material. According to one embodiment, the nanoclay based gas barrier is dispersed in the bulk of the biodegradable composition, preferably added during the melt compounding process. The dispersment of nanoclay platelets creates a tortuous path in the bulk of the composition, thus leading to a reduction in gas permeation rates though the biodegradable sheet produced. According to another embodiment, the nanoclay based gas barrier is implemented as an internal gas barrier layer in a multilayer biodegradable sheet, wherein the barrier layer reduces the gas permeation rate.

According to some embodiments, the biodegradable sheet of the invention further comprises inorganic particulate fillers, fibers, organic fillers or any combination thereof, in order to decrease self-adhesion, lower the cost, and increase the modulus of elasticity (Young's modulus) of the polymer blends.

Examples of inorganic particulate fillers include, gravel, crushed rock, bauxite, granite, limestone, sandstone, glass beads, aerogels, xerogels, mica, clay, alumina, silica, kaolin, microspheres, hollow glass spheres, porous ceramic spheres, gypsum dihydrate, insoluble salts, calcium carbonate, magnesium carbonate, calcium hydroxide, calcium aluminate, magnesium carbonate, titanium dioxide, talc, ceramic materials, pozzolanic materials, salts, zirconium compounds, xonotlite (a crystalline calcium silicate gel), lightweight expanded clays, perlite, vermiculite, hydrated or unhydrated hydraulic cement particles, pumice, zeolites, exfoliated rock, ores, minerals, and other geologic materials. A wide variety of other inorganic fillers may be added to the polymer blends, including materials such as metals and metal alloys (e.g., stainless steel, iron, and copper), balls or hollow spherical materials (such as glass, polymers, and metals), filings, pellets, flakes and powders (such as microsilica) as well as any combination thereof.

Examples of organic fillers include seagel, cork, seeds, gelatins, wood flour, saw dust, milled polymeric materials, agar-based materials, native starch granules, pregelatinized and dried starch, expandable particles, as well as combination thereof. Organic fillers may also include one or more appropriate synthetic polymers.

Fibers may be added to the moldable mixture to increase the flexibility, ductility, bendability, cohesion, elongation ability, deflection ability, toughness, and fracture energy, as well as the flexural and tensile strengths of the resulting sheets and articles. Fibers that may be incorporated into the polymer blends include naturally occurring organic fibers, such as cellulosic fibers extracted from wood, plant leaves, and plant stems. In addition, inorganic fibers made from glass, graphite, silica, ceramic, rock wool, or metal materials may also be used. Preferred fibers include cotton, wood fibers (both hardwood or softwood fibers, examples of which include southern hardwood and southern pine), flax, abaca, sisal, ramie, hemp, and bagasse because they readily decompose under normal conditions. Even recycled paper fibers can be used in many cases and are extremely inexpensive and plentiful. The fibers may include one or more filaments, fabrics, mesh or mats, and which may be co-extruded, or otherwise blended with or impregnated into, the polymer blends of the present invention.

According to further embodiments, plasticizers may be added to impart desired softening and elongation properties as well as to improve processing, such as extrusion. Optional plasticizers that may be used in accordance with the present invention include, but are not limited to, soybean oil caster oil, TWEEN 20, TWEEN 40, TWEEN 60, TWEEN 80, TWEEN 85, sorbitan monolaurate, sorbitan monooleate, sorbitan monopalmitate, sorbitan trioleate, sorbitan monostearate, PEG, derivatives of PEG, N,N-ethylene bis-stearamide, N,N-ethylene bis-oleamide, polymeric plasticizers such as poly(1,6-hexamethylene adipate), and other compatible low molecular weight polymers.

According to some embodiments, lubricants, such as salts of fatty acids, e.g., magnesium stearate, may also be incorporated into the biodegradable sheets of the invention.

According to additional embodiments, the biodegradable sheets of this invention may be embossed, crimped, quilted or otherwise textured to improve their physical properties.

The biodegradable sheet of this invention is composed of any appropriate number of layers. According to one embodiment, the biodegradable sheet of this invention comprises one layer. According to another embodiment, the biodegradable sheet of this invention comprises two layers. According to another embodiment, the biodegradable sheet of this invention comprises three layers. According to another embodiment, the biodegradable sheet of this invention comprises four layers. According to another embodiment, the biodegradable sheet of this invention comprises five layers.

According to some embodiments, the biodegradable sheets of this invention have any desired thickness. According to some embodiments, the thickness of the sheets ranges from 20-300 microns. The measured thickness will typically be between 10-100% larger than the calculated thickness when the sheets are prepared from compositions that have a relatively high concentration of particulate filler particles, which can protrude from the surface of the sheet. This phenomenon is especially pronounced when significant quantities of filler particles, having a particle size diameter that is larger than the thickness of the polymer matrix, are used.

According to some embodiments, the thickness of a one layer sheet is about 40-60 microns. According to some embodiments, the thickness of a one layer sheet is about 50 microns. According to some embodiments, the thickness of a three layer sheet is about 90-110 microns. According to some embodiments, the thickness of a three layer sheet is about 100 microns. According to some embodiments, the biodegradable sheets of the invention have a low haze.

The biodegradable sheet of this invention may be prepared using any appropriate means. According to certain embodiments, the biodegradable polymers used according to this invention are extruded (using mono or co-extrusion methods), blown, cast or otherwise formed into sheets for use in a wide variety of packaging materials, or they may be molded into shaped articles. According to some embodiments, known mixing, extrusion, blowing, injection molding, and blow molding apparatus known in the thermoplastic art are suitable for use in forming the biodegradable sheets of this invention. In an embodiment of the invention, the sheet may be blown into various shapes including a shape of a bottle. According to one embodiment of the invention, the biodegradable sheet is prepared by compounding the raw biopolymers and possible additives and then preparing a sheet in a cast extruder. Once the biodegradable sheet is prepared, it is post-treated by heat sealing, according to some embodiments, to join two parts of the same sheet or two separate sheets, in order to prepare pockets, pouches etc. According to further embodiments, the biodegradable sheets of this invention are coated with any appropriate coating, while ensuring that the end product remains biodegradable.

According to further embodiments, the one layered biodegradable sheet of the invention comprises about 20% w/w PLA and about 80% w/w PBS. According to further embodiments, the biodegradable sheet of the invention comprises about 20% w/w PLA, about 40% w/w PBS and about 40% w/w novamont CF. According to further embodiments, the biodegradable sheet of the invention comprises about 33% w/w PLA, about 33% w/w PBS and about 33% w/w ecoflex.

According to further embodiments, the one layered biodegradable sheet of the invention consists of about 20% w/w PLA and about 80% w/w PBS. According to further embodiments, the biodegradable sheet of the invention consists of about 20% w/w PLA, about 40% w/w PBS and about 40% w/w novamont CF. According to further embodiments, the biodegradable sheet of the invention consists of about 33% w/w PLA, about 33% w/w PBS and about 33% w/w ecoflex.

According to further embodiments, the multi-layered biodegradable sheet of the invention comprises the following three layers, wherein layer 2 is sandwiched between layers 1 and 3 so that layers 1 and 3 are on the outside of the sheet, in direct contact with the outside atmosphere, while layer 2 is positioned between them e:
Layer 1: comprising about 33.3% w/w PLA, 33.3% w/w PBS and 33.3% w/w Ecoflex;
Layer 2: comprising about 100% w/w PHA; and
Layer 3: comprising about 33.3% w/w PLA, 33.3% w/w PBS and 33.3% w/w Ecoflex.

According to further embodiments, the multi-layered biodegradable sheet of the invention comprises the following three layers:
Layer 1: comprising about 33.3% w/w PLA, 33.3% w/w PBSA and 33.3% w/w PBAT;
Layer 2: comprising about 100% w/w PBAT; and
Layer 3: comprising about 33.3% w/w PLA, 33.3% w/w PBSA and 33.3% w/w PBAT.

According to further embodiments, the multi-layered biodegradable sheet of the invention consists the following three layers:
Layer 1: consisting about 33.3% w/w PLA, 33.3% w/w PBS and 33.3% w/w Ecoflex;
Layer 2: consisting about 100% w/w PHA; and
Layer 3: consisting about 33.3% w/w PLA, 33.3% w/w PBS and 33.3% w/w Ecoflex.

According to further embodiments, the multi-layered biodegradable sheet of the invention consists the following three layers:
Layer 1: consisting about 33.3% w/w PLA, 33.3% w/w PBSA and 33.3% w/w PBAT;
Layer 2: consisting about 100% w/w PBAT; and
Layer 3: consisting about 33.3% w/w PLA, 33.3% w/w PBSA and 33.3% w/w PBAT.

Some embodiments of the invention are directed to a biodegradable polymeric sheet including at least one layer comprising about 15-25% w/w PLA and about 75-85% w/w PBSA. Additional embodiments are directed to a biodegradable polymeric sheet including at least one layer comprising about 15% w/w PLA and about 85% w/w PBSA. Additional embodiments are directed to a biodegradable polymeric sheet including at least one layer comprising about 20% w/w PLA and about 80% w/w PBSA. Additional embodiments are directed to a biodegradable polymeric sheet including at least one layer comprising about 25% w/w PLA and about 75% w/w PBSA. Additional embodiments are directed to a biodegradable polymeric sheet including at least one layer comprising about 15, 16, 17, 18, 19, 20, 21, 22, 23, 24, or 25% w/w PLA and about 85, 84, 83, 82, 81, 80, 97, 78, 77, 76 or 75% w/w PBSA, respectively.

According to some embodiments, the sheet is a single layered sheet comprising about 15-25% w/w PLA and about 75-85% w/w PBSA. Further embodiments are directed to a single layered sheet comprising about 15% w/w PLA and about 85% w/w PBSA. Further embodiments are directed to a single layered sheet comprising about 20% w/w PLA and about 80% w/w PBSA. Further embodiments are directed to a single layered sheet comprising about 25% w/w PLA and about 75% w/w PBSA. Additional embodiments are directed to a single layer biodegradable polymeric sheet comprising about 15, 16, 17, 18, 19, 20, 21, 22, 23, 24, or 25% w/w PLA and about 85, 84, 83, 82, 81, 80, 97, 78, 77, 76 or 75% w/w PBSA, respectively.

According to some embodiments, the sheet is a multi-layered sheet, wherein at least one layer comprises about 15-25% w/w PLA and about 75-85% w/w PBSA. According to some embodiments, the sheet is a multi-layered sheet, wherein at least one layer comprises about 15% w/w PLA and about 85% w/w PBSA. According to some embodiments, the sheet is a multi-layered sheet, wherein at least one layer comprises about 80% w/w PBSA. According to some embodiments, the sheet is a multi-layered sheet, wherein at least one layer comprises PLA and PBSA at a w/w ratio of about 25% w/w PLA and about 75% w/w PBSA. Additional embodiments are directed to a multi-layered biodegradable polymeric sheet, wherein at least one layer comprises PLA and PBSA at a w/w ratio of about 15, 16, 17, 18, 19, 20, 21, 22, 23, 24, or 25% w/w PLA and about 85, 84, 83, 82, 81, 80, 97, 78, 77, 76 or 75% w/w PBSA, respectively.

According to some embodiments, the sheet is a multi-layered sheet, wherein two or more layers comprise about 15-25% w/w PLA and about 75-85% w/w PBSA. According to some embodiments, the sheet is a multi-layered sheet, wherein two or more layers comprise about 15% w/w PLA and about 85% w/w PBSA. According to some embodiments, the sheet is a multi-layered sheet, wherein two or more layers comprise about 20% w/w PLA and about 80% w/w PBSA. According to some embodiments, the sheet is a multi-layered sheet, wherein two or more layers comprise about 25% w/w PLA and about 75% w/w PBSA. Additional embodiments are directed to a multi-layered biodegradable polymeric sheet wherein two or more layers comprise about 15, 16, 17, 18, 19, 20, 21, 22, 23, 24, or 25% w/w PLA and about 85, 84, 83, 82, 81, 80, 97, 78, 77, 76 or 75% w/w PBSA.

According to some embodiments, the multi-layered sheet is designed such that the layer comprising about 15% w/w PLA and about 85% w/w PBSA is an internal layer, i.e., it is positioned between two adjacent layers, such that it is not in contact with the outside atmosphere.

According to some embodiments, the multi-layered sheet is designed such that the layer comprising about 15% w/w PLA and about 85% w/w PBSA is an external layer, i.e., it is positioned such that it adheres to only one additional layer of the sheet, such that the layer comprising about 15% w/w PLA and about 85% w/w PBSA comes in contact with the outside atmosphere. According to such an embodiment, if a receptacle is prepared therefrom, the receptacle may include an outer layer (i.e. a layer in contact with the outer surroundings) comprising about 15% w/w PLA and about 85% w/w PBS, and/or an inner layer (i.e., a layer in contact with the contents of the receptacle) comprising about 15% w/w PLA and about 85% w/w PBSA.

According to some embodiments, the receptacle includes at least two layers comprising about 15% w/w PLA and about 85% w/w PBSA, wherein at least one such layer is an inner layer and/or at least one such layer is an outer layer. According to some embodiments, the receptacle includes at least one inner layer and at least one outer layer, wherein each of the inner layer and the outer layer comprises about 15-25% w/w PLA and about 75-85% w/w PBSA.

According to another embodiment, the biodegradable compositions of this invention are suitable for injection molding. Injection molding is used according to this invention to prepare any appropriate shape, including a means for removing liquid from a beverage receptacle, such as a spout, a straw, an opening covered by a cap, etc. The physical and mechanical properties of the injection molded biodegradable material according to this invention are as follows:

| Specific Gravity | 1.0-1.5 | ASTM D792 |
| Melt volume rate (190° C./2.16 kg) [cm³/10 min] | 3.0-8.0 | ASTM D1238 |
| Melt flow rate (190° C./2.16 kg) [g/10 min] | 4.0-9.0 | ASTM D1238 |
| Tensile Strength & Break, (MPa) | 30-50 | ASTM D882 |
| Tensile Modulus, (MPa) | 800-1200 | ASTM D882 |
| Tensile Elongation, % | 200-400 | ASTM D882 |

According to some embodiments of the invention, the biodegradable composition that is molded by injection is prepared from 75% PBSA and 25% PLA. The physical and mechanical properties of this composition are as follows:

| Specific Gravity | 1.25 | ASTM D792 |
| Melt volume rate (190° C./2.16 kg) [cm³/10 min] | 3.9 | ASTM D1238 |
| Melt flow rate (190° C./2.16 kg) [g/10 min] | 4.2 | ASTM D1238 |
| Tensile Strength @ Break, (MPa) | 32 | ASTM D882 |
| Tensile Modulus, (MPa) | 894 | ASTM D882 |
| Tensile Elongation, % | 339 | ASTM D882 |

The biodegradable sheet of the invention may be used for any application requiring such a sheet. According to one embodiment, the biodegradable sheet of the invention is used in the preparation of a receptacle for liquids, including water, beverages and liquid food matter.

According to one embodiment of the invention, there is provided a separable beverage receptacle packaging comprising a plurality of receptacle units possible of different volume, formed in a contiguous fashion, wherein each can be torn-off on demand. The separable beverage receptacle packaging may be made from a biodegradable material. In an embodiment of the invention, the separable beverage receptacle packaging is made from the biodegradable sheet described herein. According to one embodiment, the receptacle units are attached to one another in a side by side arrangement. According to another embodiment, the receptacle units are attached to one another so that the bottom of one unit is attached to the top of the other unit. According to further embodiments, the separable beverage receptacle packaging of the present invention comprises a plurality of receptacle units, any number of which may have a different volume and shape. According to further embodiments, at least two of the receptacle units have a different volume. According to one embodiment, at least one of the receptacle units is asymmetrical. According to further embodiments more than one of the receptacle units is asymmetrical.

Each receptacle (e.g., a pouch, a bag or any other type of essentially flexible receptacle) includes two sheets of flexible and sufficiently impermeable biodegradable material, such as the biodegradable compositions detailed herein. According to one embodiment, the biodegradable sheets are heat sealed along defined lines to create the individual receptacle units, which are separated from one another by a line of scored perforations that allows the individual receptacle units to be physically separated from one another. According to some embodiments, the perforation lines are adapted to provide receptacle units with different volumes that correspond to the amount of liquids regularly consumed by family members. According to one embodiment, the perforations between each two receptacle units are such that once detached there is no wasted material, i.e., there is no excess material found between the receptacle units that is not part of the receptacle unit itself.

The plurality of receptacle units, which are connected to one another, is related to herein as an array. The array of this invention comprises any number of receptacle units, any number of which may be of different shape and/or volume.

According to one embodiment, the volume of each receptacle unit ranges from 100-500 ml. According to a further embodiment, the volume of each receptacle unit ranges from 200-350 ml. According to one embodiment, the shape of at least one receptacle unit is triangular. According to another embodiment, the shape of at least one receptacle unit is pyramidal.

According to one embodiment, the array is terminated with a hanger for efficient storage (see, e.g., FIGS. 6A-D and 7A-D). According to one embodiment, such a hanger is formed as a round hole in the array. According to this invention, each receptacle unit includes a compartment for storing liquids and a means for removing the liquids therefrom. The means for removing the liquids from the compartment include a straw (see, e.g., FIGS. 1, 2A-C, 6A-D and 7A-D), a conduit (see, e.g., FIGS. 3A-E), a spout, an opening covered by a cap (see, e.g., FIGS. 3F and 4A), an opening closed by a stopper and a foldable unit that when unfolded creates an opening through which liquids can exit the compartment (see, e.g., FIGS. 5A and 5B). According to some embodiments, the compartment does not comprise an opening; but rather an opening is formed by the movement of an element, such as a cap, attached to the compartment.

According to some embodiments, each receptacle unit comprises a compartment for storing liquid and a straw. According to one embodiment, the straw is hermetically sandwiched between the sheets of the compartment in such a way that it has two segments, an internal segment that is found inside the compartment and an external segment that is found outside the compartment. According to further embodiments, each receptacle unit further comprises a sealing edge for sealing the external segment of the straw that is also hermetically sandwiched between the sheets of the sealing edge. According to some embodiments, a perforated line is placed between the sealing edge and the compartment, which perforated line enables tearing off the sealing edge and exposing the external segment of the straw.

According to one embodiment of the invention, the straw includes two opposing members positioned between the external segment and the internal segment of the straw. These members are attached to the biodegradable sheets of the receptacle unit, e.g., by heat sealing them between the two sheets, which, therefore, prevent movements of the straw as well as leaks from around the straw. According to one embodiment, the members are tapered to as to ease their attachment to the receptacle unit.

According to further embodiments, the receptacle unit includes a compartment for storing liquids and a conduit, through which the liquids may be emptied from the compartment. According to one embodiment, the conduit is formed from a continuation of the biodegradable sheets forming the compartment. According to one embodiment, the conduit is sealed at the end, e.g., by heat, and comprises a perforated line, which aids in opening the conduit and removing the liquids from the compartment, when desired. According to one embodiment, the conduit is folded over when not in use. According to a further embodiment, the conduit is attached to the side of the compartment when not in use.

According to the invention, the receptacle units are attached to one another at any appropriate location on each receptacle unit. According to one embodiment of the invention, the receptacle units are attached to one another in a side by side fashion, wherein the opening of each unit is positioned in any appropriate direction. According to one embodiment, the opening of each receptacle unit is either upwards or downwards, when the receptacle units are connected in a side by side fashion. According to one embodiment, the openings of the receptacle units alternate, i.e., the first pointing up (or down) and the next pointing down (or up). According to further embodiments, any number of openings is located on the side, front or back of the receptacle unit. According to this invention, any such opening may comprise a straw as detailed above.

According to another embodiment, the biodegradable sheets are used to manufacture pouches of larger volume, to be used as substitute to larger plastic bottles for feeding purified water dispensing appliances. In this case, the pouch will have a spout that perfectly matches the inlet of the water dispensing appliance. The pouch will have hanging members that allow for hanging of the pouch, such that the spout is the lowermost, in order to allow water to exit the pouch by gravity. According to one embodiment, before use, the spout is sealed by flexible material that may be pierced by a proper tip extending from the inlet of the water dispensing appliance. Alternatively, the pouch may be inserted into an adapter which receives the pouch, guides it towards the piercing tip and holds it in place, as long as it is not empty.

FIG. 1 illustrates the construction of an exemplary array of receptacle units (related to herein also as pouches) of different volume, formed in a contiguous side by side fashion wherein each can be torn off on demand. The array 10 may include a plurality of pouches of different volume (in this example, volumes of 200 ml, 250, 300 and 350 ml), such that the entire array is delimited within a size of 20×37 cm. Each pouch is separated from its neighboring pouches by a perforated curved line, for allowing optimal division of the delimited area between different pouches. Each individual pouch may be marked to show its volume and content, such as pouch 101.

FIG. 2A illustrates the layout of a single pouch, according to an embodiment of the invention. The pouch 101, which is torn off from array 10, comprises a compartment 102 for storing the liquid, an internal segment of straw 103 that is hermetically sandwiched between the sheets of the compartment 102 and a sealing edge 104 for sealing the external segment of straw 103 that is also hermetically sandwiched between the sheets of the sealing edge 104. A perforated line 105 is implemented between the sealing edge 104 and the compartment 102.

Figure 2B:
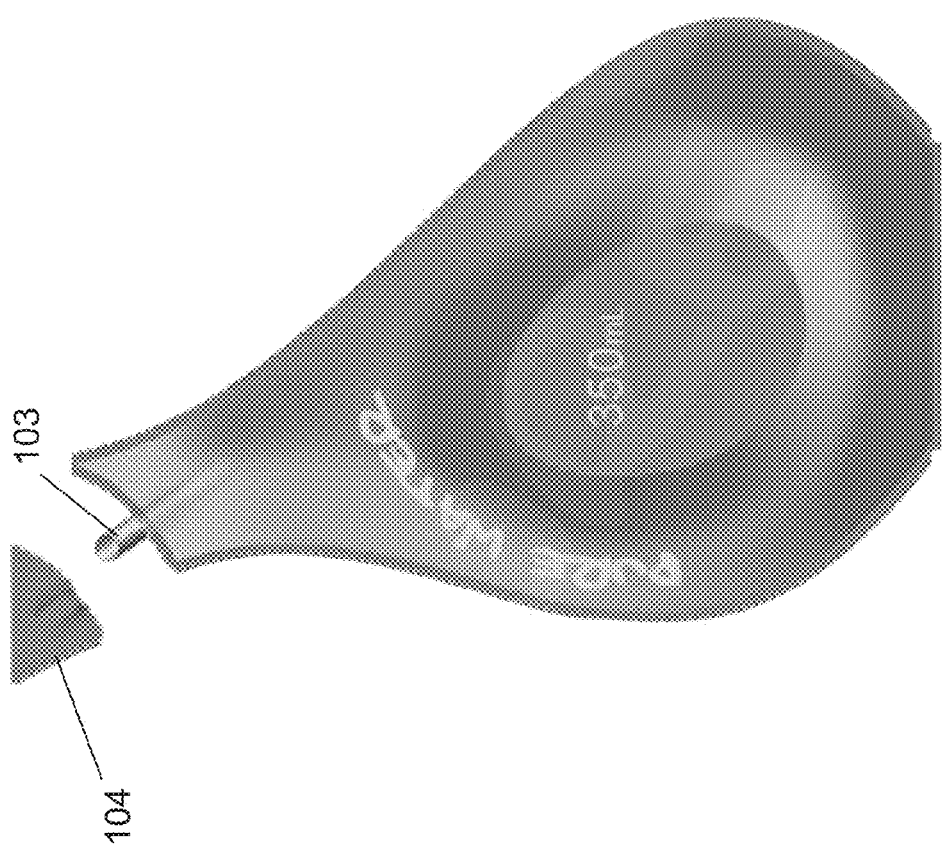
FIGS. 2B and 2C illustrate using a single receptacle units, according to another embodiment of the invention.
Figure 2C:
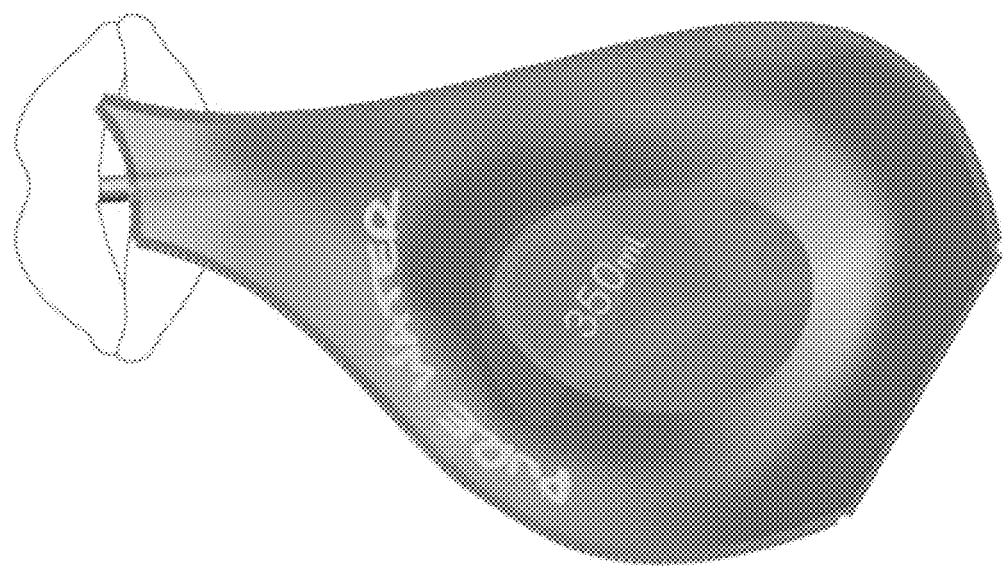

The user can tear off the sealing edge 104 along the perforated line 105 and remove the sealing edge 104 from the external segment of straw 103, as shown in FIG. 2B. This enables the user to drink the fluid via the external segment of straw 103, as shown in FIG. 2C.

FIG. 2D illustrates the layout of an internal straw segment, according to an embodiment of the invention. The straw segment 103 has two opposing tapered members 103*a* and 103*b* extending outwardly, so as to be attached to (i.e., sandwiched between) the biodegradable impermeable sheets that define the compartment.

Figure 2E:
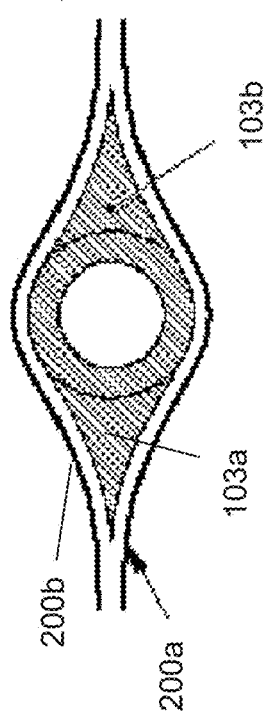
FIG. 2E illustrates a cross-sectional view of a sealed internal straw segment, according to an embodiment of the invention.

FIG. 2E illustrates a cross-sectional view of a sealed internal straw segment, according to an embodiment of the invention. The two opposing tapered members 103*a* and 103*b* are pressed between the two opposing biodegradable impermeable sheets 200, so as to obtain sealing pressure and prevent both movement of the straw and leaks from around it.

Figure 3A:
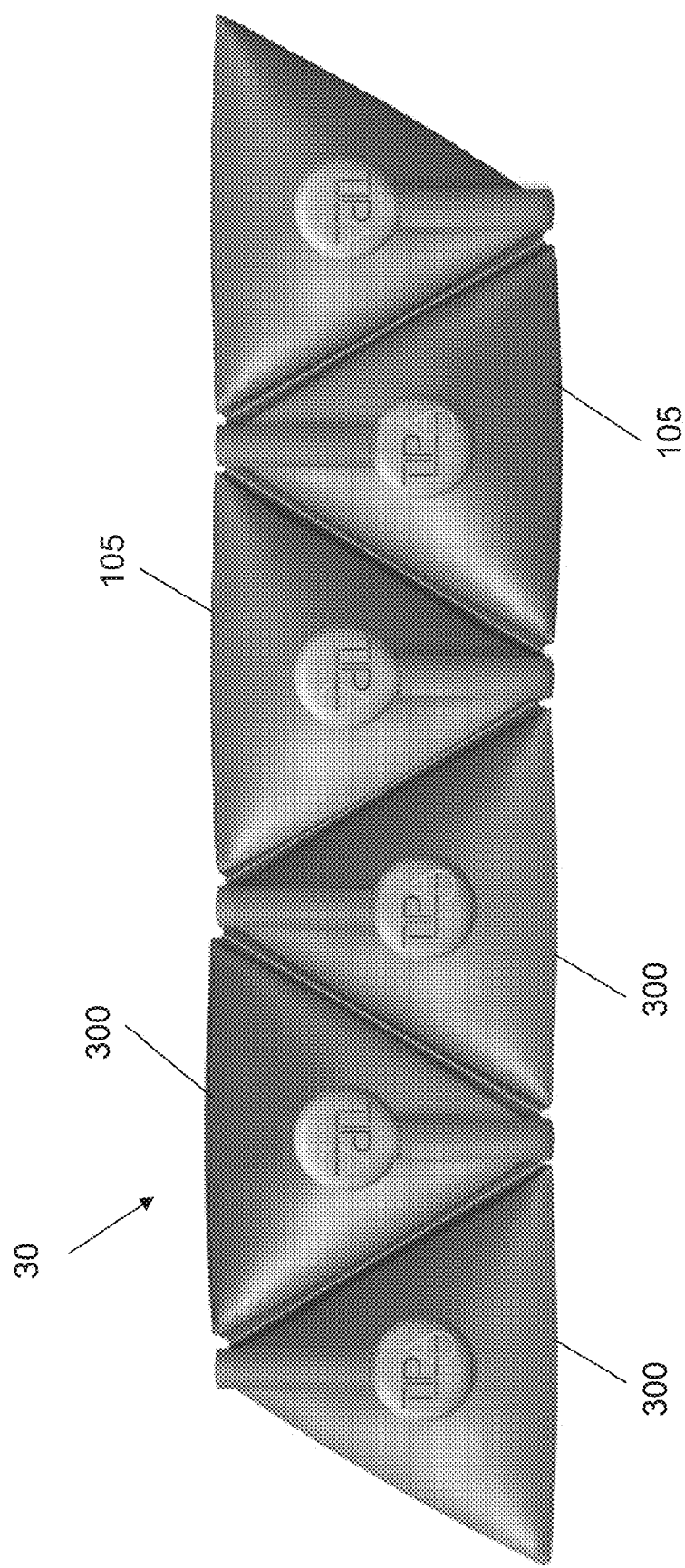
Figure 3B:
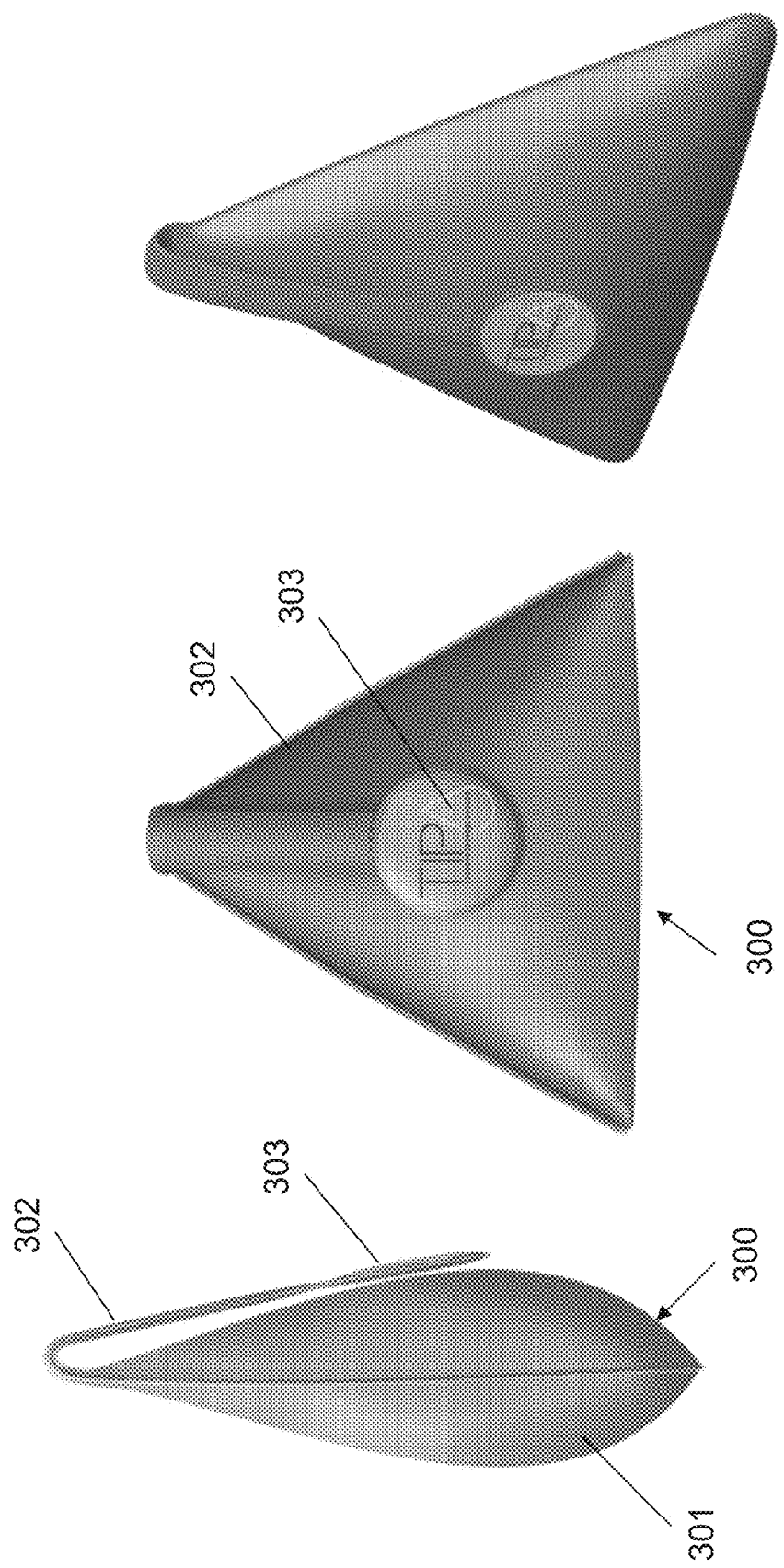

FIG. 3A illustrates the layout of an array of six pouches, according to an embodiment of the invention. Whenever needed, each pouch 300 can be torn-off from array 30 along the corresponding perforated line 105. The fluid storage compartment 301 of each single pouch 300 is terminated by a flat conduit 302 having a sealing edge 303 at its distal end, as shown in FIG. 3B (front view). Before use, the flat conduit 302 is bent (e.g., to form a U-shape) and the sealing edge 303 is attached to the side-wall of the pouch 300 (side view). The perforated line 105 may be of full length or of partial length.

Figure 3D:
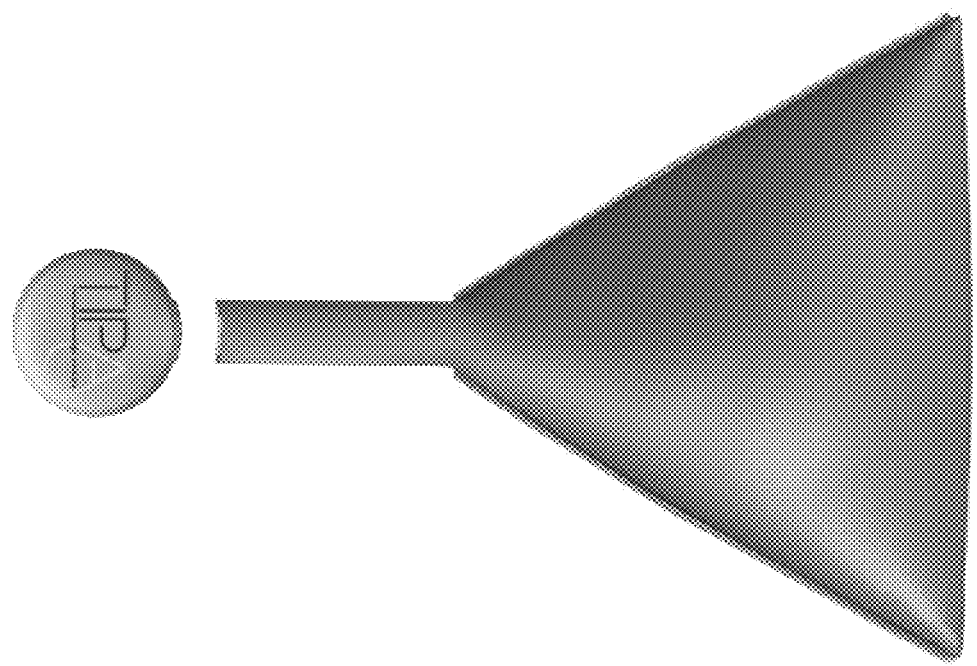
Figure 3E:
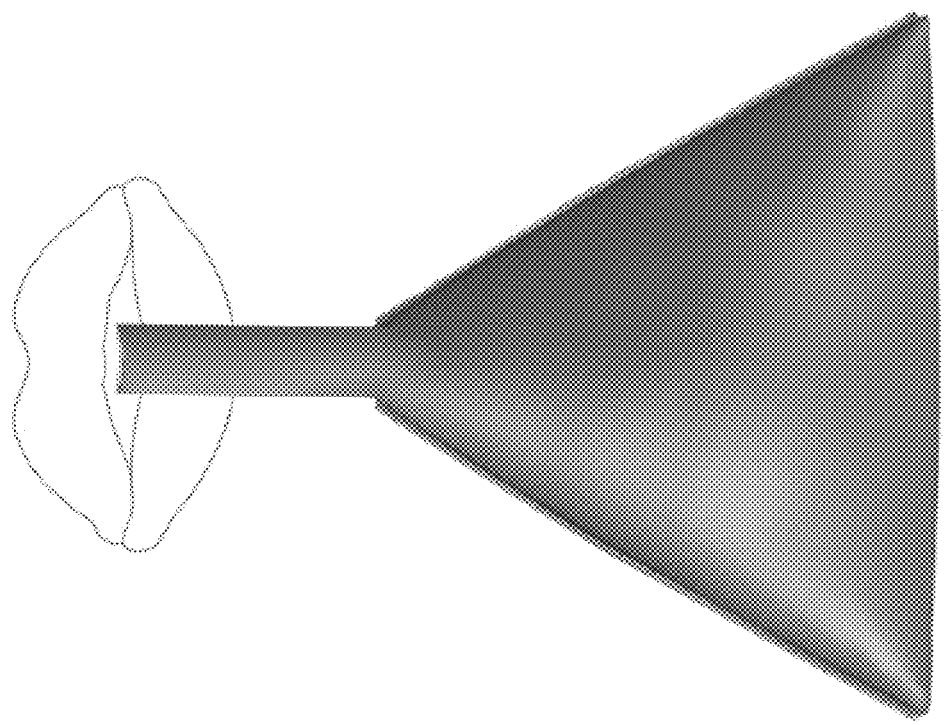

When the user wishes to drink, he first detaches the sealing edge 303 from the side-wall and straightens the flat conduit 302, as shown in FIG. 3C. Then he tears-off the sealing edge 303 along the perforated line 105 and removes the sealing edge 303 from the distal end of flat conduit 302, thereby breaking the sealing and opening the distal end, to form a straw segment, as shown in FIG. 3D. Now the user can drink the fluid via the distal end, as shown in FIG. 3E. The straw segment, as well as the sealing edge 303, may be made from the same biodegradable material that the pouch is made of.

Figure 3F:
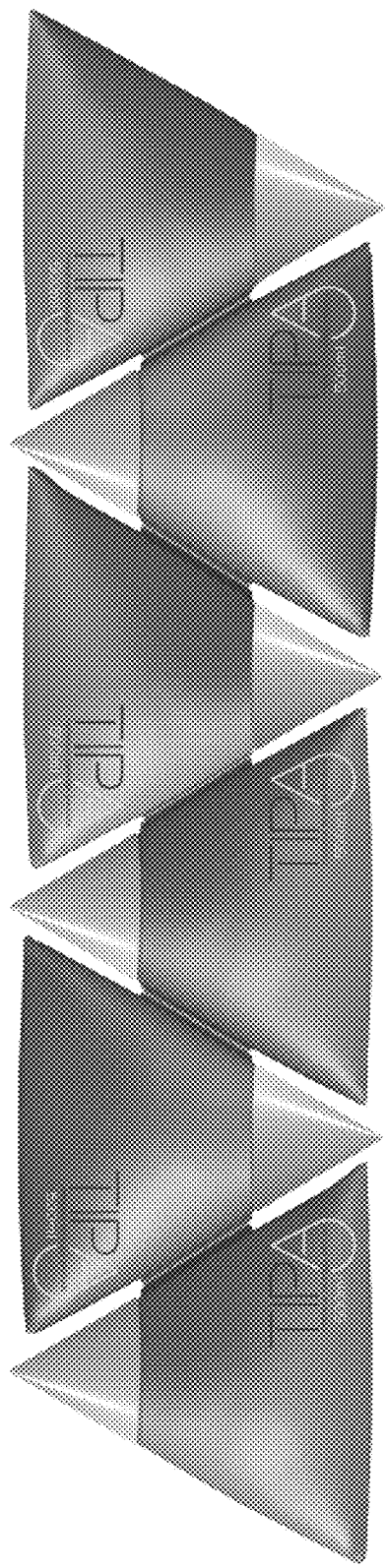

FIG. 3F illustrates an array of several receptacle units attached to one another in a side by side fashion so that the openings thereof alternate in an upward-downward position. As shown in FIG. 3F, only the middle portion of the various receptacle units is attached to one another.

Figure 4B:
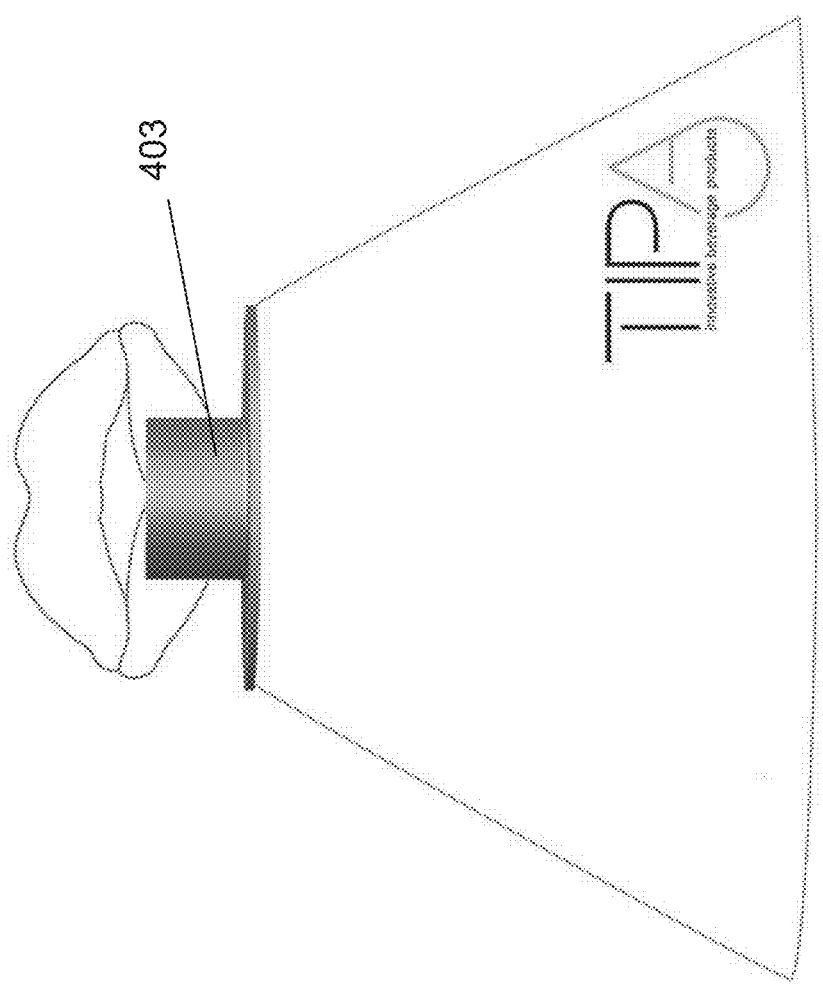
Figure 4C:
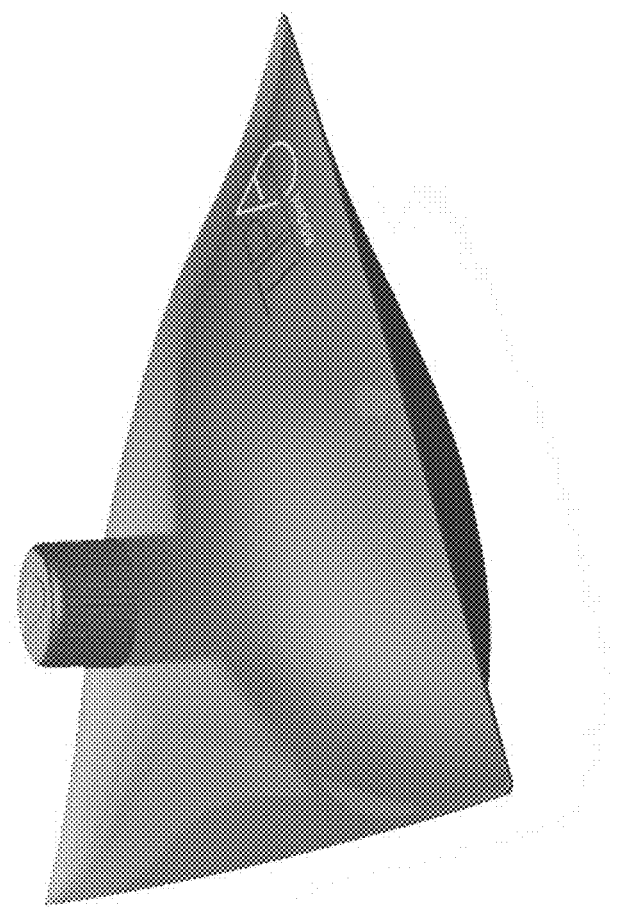

FIG. 4A illustrates the layout of a single pouch, according to another embodiment of the invention. The pouch 400 comprises a clipped compartment 401 for storing the liquid, which is terminated by a flat surface 402, from which a conduit segment 403 extends outwardly. The proximal end of conduit segment 103 is terminated with a sealing disc (not shown) that is a part of the flat surface 402. The sealing disc also has several niches formed therein, for receiving mating projections. The sealing disc is attached to the edges of the conduit segment 403 by a relatively weak layer that seals the compartment 401, but can be broken by applying a rotational shearing force on it. The shearing force may be applied by a top cover 404 that includes several projections 405. These projections 405 are designed to mate the formed niches, such that when the cover 404 is attached to the distal end of conduit segment 403, the niches formed in the sealing disc receive the mating projections 405 and remain unreleasably attached to them (e.g., by a unidirectional elastic connection). According to this embodiment, when the user wishes to drink, he has to rotate the top cover 404, to thereby break the weak layer and disconnect the sealing disc from the edges of the conduit segment 403. According to this embodiment, the sealing is broken and the user removes the top cover along with the sealing disc that is now attached to the top cover. Thus, the user can drink the fluid via the conduit segment 403, as shown in FIG. 4B. Alternatively, clipping of the compartment may be eliminated by locating the top cover in the middle of the sidewall, as shown in FIG. 4C. In this case, the pouch can be laid on any flat support. In both configurations, the top cover may be reused (screwed), so as to seal the conduit segment 403.

Figure 4D:
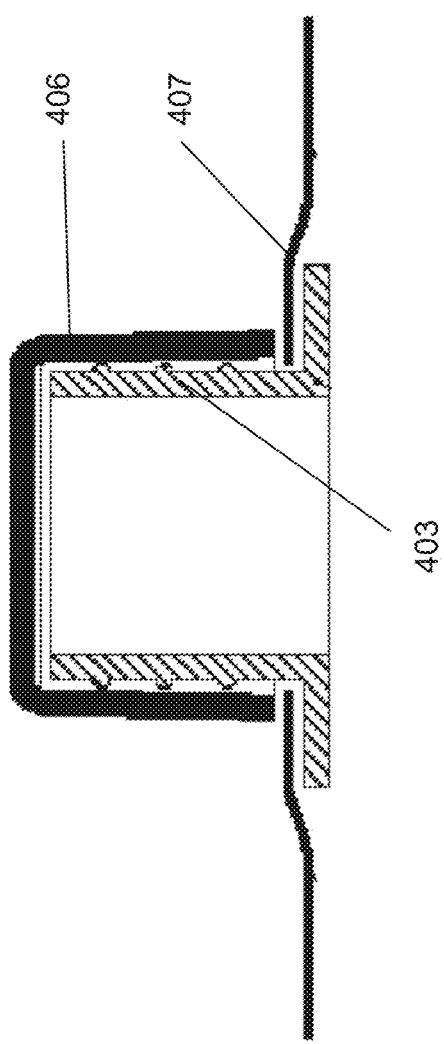
FIG. 4D is a cross-sectional view of the top cover sealing arrangement, according to another embodiment of the invention.

FIG. 4D is a cross-sectional view of the top cover sealing arrangement. In this arrangement, the top cover 406 is screwed on top of the conduit segment 403, which is heat welded to the edges of the biodegradable impermeable sheet 407, so as to obtain impermeable sealing.

Figure 5A:
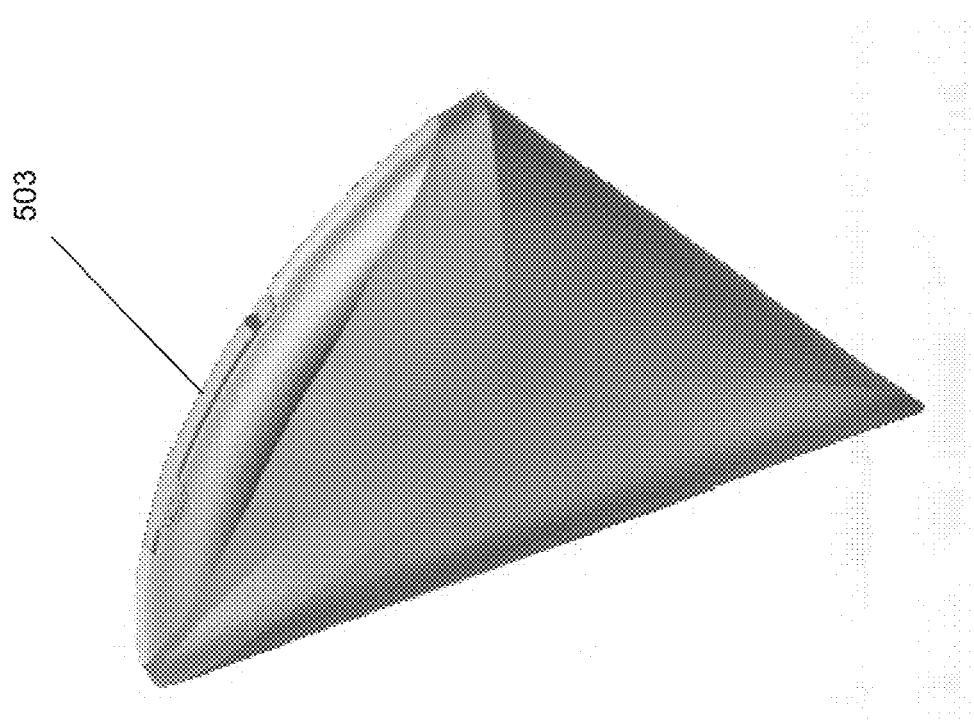
FIGS. 5A and 5B illustrate the layout of a single receptacle units with a pivotally foldable straw, according to another embodiment of the invention.
Figure 5B:
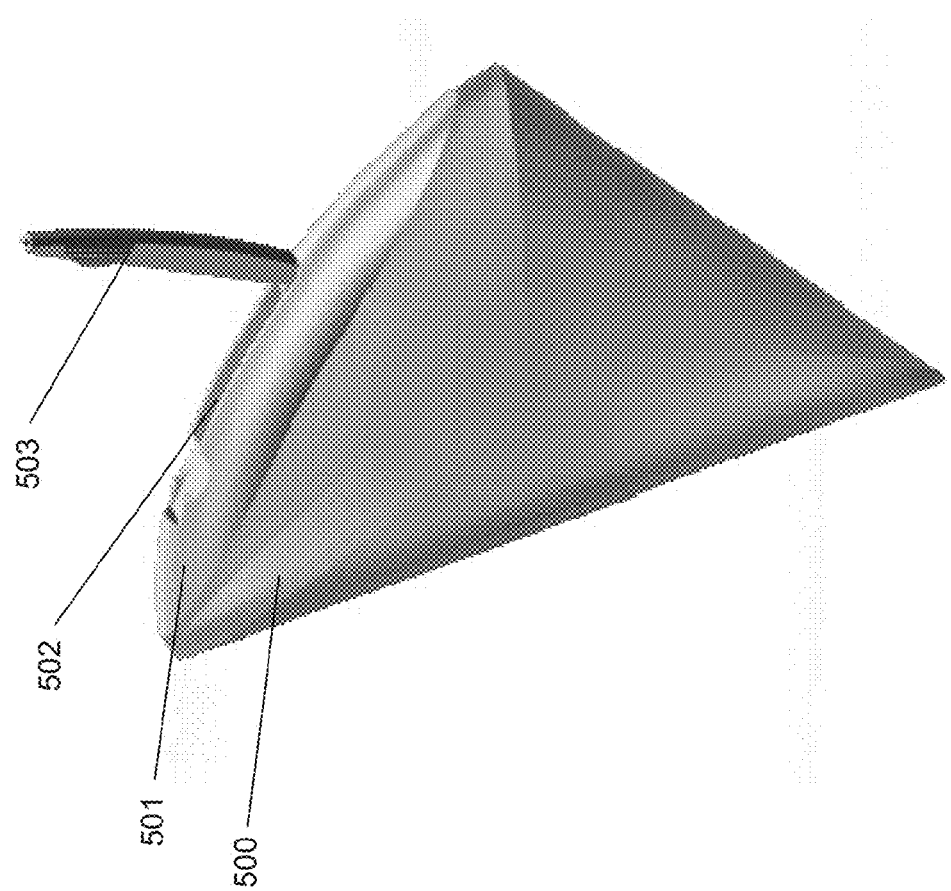

FIGS. 5A and 5B illustrate the layout of a single pouch with a pivotally foldable straw, according to another embodiment of the invention. The pouch 500 comprises a rigid arched member 501 attached to the edge of the pouch 500. Arched member 501 comprises an elongated groove 502 (cradle) for receiving a matching pivotally foldable rigid straw 503, which has a tubular conduit for allowing fluid to flow. Arched member 501 also comprises at its end a spherical tap (not shown) with an orifice into the pouch's cavity. This spherical tap is also used as a joint around which straw 503 can pivot. As long as the pouch is stored, straw 503 lies within groove 502 (as shown in FIG. 5A) and the tubular conduit does not overlap the orifice in the spherical tap. In this position the pouch is sealed. When the straw 503 is lifted to its vertical position (as shown in FIG. 5B), the tubular conduit overlaps the orifice in the spherical tap and fluid can flow out of the pouch via straw 503 into the user's mouth. The pouch can be sealed again by folding straw 503 back into the cradle after use. It is also possible to add a sealing sheet to the upper end of the orifice to increase the sealing level before use and to include a puncturing tip at the end of straw 503, such that the sealing sheet will be punctured when straw 503 is lifted to its vertical position.

Figure 6C:
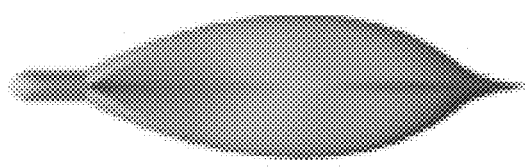
Figure 6B:
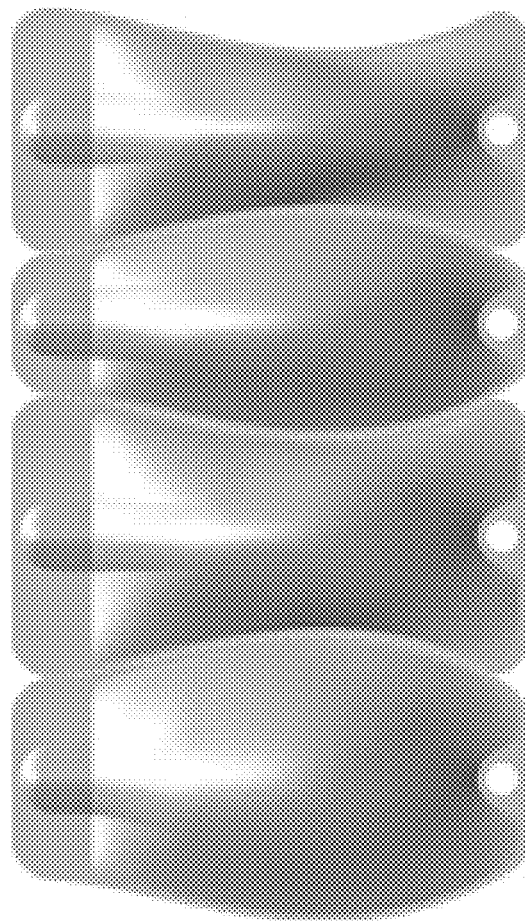
Figure 6D:
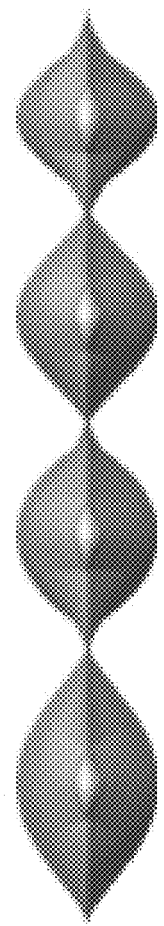

FIGS. 6A, 6B, 6C and 6D illustrate an array of four receptacle units, all of which are closed. FIG. 6A is an overview of the array, which include four separable receptacle units, separated from one another by perforated lines. Further, as shown in FIG. 6A, each of the receptacle units includes a straw at the top (closed in this figure) and a hole at the bottom, by which the receptacle unit can be hung from any type of hook, rope, twine, etc. FIG. 6B is a front view of the array, FIG. 6C is a side view of the array and FIG. 6D is a top view of the array.

Figure 7A:
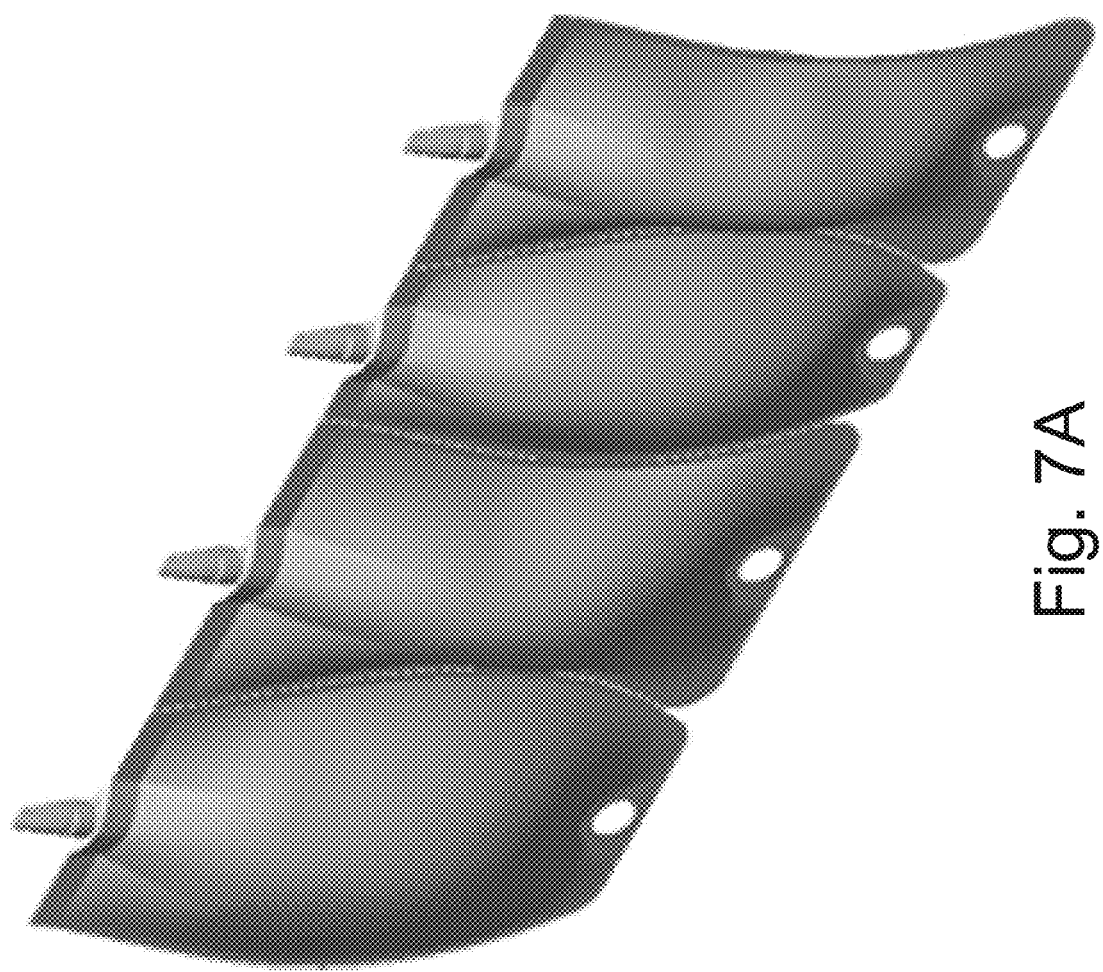
FIGS. 7A-D illustrate an array of four receptacle units, according to an embodiment of the invention, wherein all of the receptacle units are opened (FIG. 7A is an overview of the array, FIG. 7B is a front view of the array.
Figure 7C:
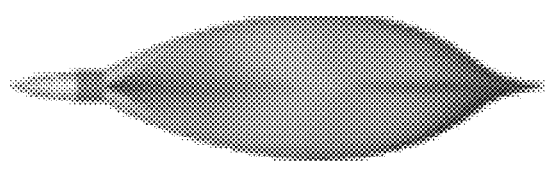
Figure 7B:
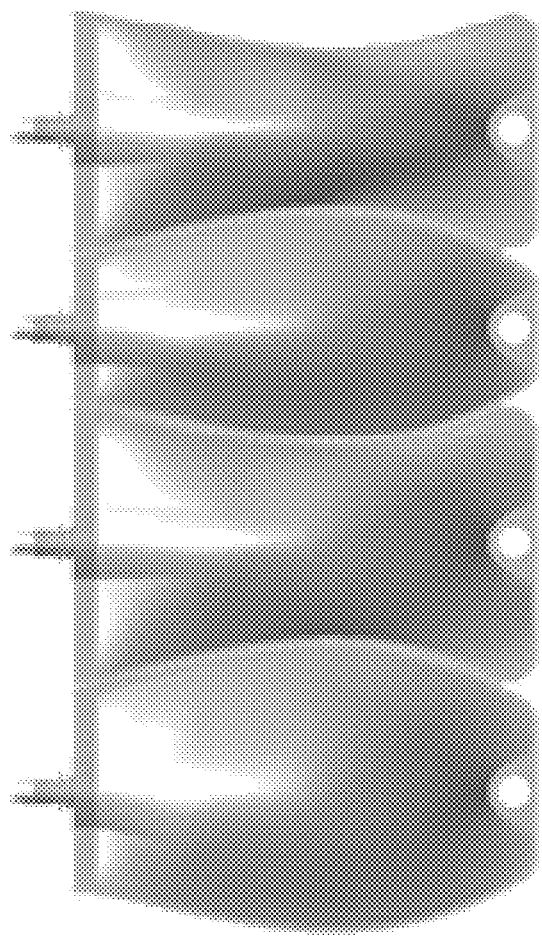
Figure 7D:
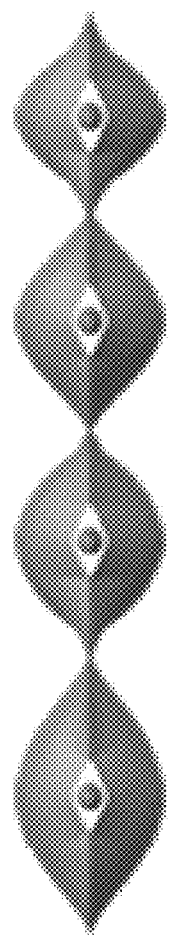

FIGS. 7A, 7B and 7C show the same array as shown in FIGS. 6A-D; however, in FIGS. 7A-D, all of the receptacle units are opened, having a straw protruding from the top of each unit. Specifically, FIG. 7A is an overview of the array, FIG. 7B is a front view of the array, FIG. 7C is a side view of the array and FIG. 7D is a top view of the array.

According to another embodiment, the biodegradable sheets are made of two laminated layers. The first layer is an inner layer, made of 10-50μ thick PLA that is in contact with the liquid. The second layer is an outer layer, made of 50-150μ thick starch that is exposed to the air. Both layers are attached to each other by an adhesive layer, the weight of which is less that 1% of the total weight of the laminated layers. This combination is unique, due to the fact that the laminated sheet is sufficiently impermeable to hold liquids, while being sufficiently flexible to allow efficient and comfortable production of pouches.

According to another embodiment, the biodegradable sheet, which is highly flexible and transparent and is suitable for carrying liquids, is made of Polylactic Acid (PLA) blended with additional biodegradable polyesters, such as: polybutylene succinate (PBS), polybutylene succinate adipate (PBSA), poly(tetramethylene adipate-coterephthalate) (PTAT), thermoplastic starch blends.

The Polylactic acids include poly(L-lactic acid), whose structural units are L-lactide acid; poly(D-lactide acid), whose structural units are D-lactic acid; poly(DL-lactic acid) which is a copolymer of L-lactic acid and D-lactic acid; and any mixture thereof.

Different combinations of the above mentioned polymers should be melt compounded using a twin-screw extruder. The polymer blends are extruded in the form of strands to form pellets. The pellets contain a physical mixture (blend) of the different polymers used. The blends are then extruded in a cast or a blow-film extruder in order to obtain films or sheets. In order to increase the barrier of the films and sheets, metalized laminates of the above described polymers can be obtained using an aluminum film or aluminum vapor deposition.

Various aspects of the invention are described in greater detail in the following Examples, which represent embodiments of this invention, and are by no means to be interpreted as limiting the scope of this invention.

EXAMPLES

Example 1

Single Layered Biodegradable Sheets

All of the single layered sheets related to herein were 50 microns thick.

Sheet #1: A single layered biodegradable sheet consisting of 33.3% w/w PLA, 33.3% w/w PBS and 33.3% w/w Ecoflex was prepared as follows:

A. Melt Extrusion Compounding Stage:
1. 166.7 gr PLA, 166.7 gr PBS and 166.7 gr Ecoflex were dried overnight at a temperature of 50° C. under vacuum;
2. the dried polymers were dry blended and placed in a two screw PRISM compounder;
3. the polymers were melt extruded in the PRISM compounder set to the following profile:
    i) temperature profile: 170-175-180-185-190° C. (the Die is set to 190° C.);
    ii) screw speed: 250 rpm; and
    iii) pressure: 15-25 bar.

B. Cast Extrusion Stage:
1. the melt extruded material was dried overnight at a temperature of 50° C. under vacuum;
2. the material was placed into a Randcastle Extruder set to the following profile:
    i) 170-180-190° C.-180° C.—Adaptor; 185° C.—feedblock; Die-185° C.;
    ii) screw speed: 80 rpm; and
    iii) head pressure 590 bar.

The measured physical properties of Sheet #1 were as follows: Stress at Maximum Load was 25 MPa, the Strain at Break was 415% and Young's Modulus was 679 MPa.

Sheet #2: A single layered biodegradable sheet consisting of 20% w/w PLA and 80% w/w PBS was prepared using the same procedure described above for Sheet #1, wherein the amounts of the polymers used were 100 gr PLA and 400 gr PBS. The measured physical properties of Sheet #2 were as follows: Stress at Maximum Load was 47 MPa, the Strain at Break was 731% and Young's Modulus was 569 MPa.

Sheet #3: A single layered biodegradable sheet consisting of 20% w/w PLA, 40% w/w PBS and 40% Novamont CF was prepared using the same procedure described above for Sheet #1, wherein the amounts of the polymers used were 100 gr PLA, 200 gr PBS and 200 gr Novamont. The measured physical properties of Sheet #3 were as follows: Stress at Maximum Load was 33 MPa, the Strain at Break was 579% and Young's Modulus was 603 MPa.

Sheet #4: A single layered biodegradable sheet consisting of 60% w/w PLA and 40% w/w PBS was prepared using the same procedure described above for Sheet #1, wherein the amounts of the polymers used were 300 gr PLA and 200 gr PBS. The measured physical properties of Sheet #4 were as follows: Stress at Maximum Load was 40 MPa, the Strain at Break was 240% and Young's Modulus was 1274 MPa.

Sheet #5: A single layered biodegradable sheet consisting of 55% w/w PLA and 45% w/w PBS was prepared using the same procedure described above for Sheet #1, wherein the amounts of the polymers used were 275 gr PLA and 225 gr PBS. The measured physical properties of Sheet #5 were as follows: Stress at Maximum Load was 45 MPa, the Strain at Break was 4% and Young's Modulus was 1414 MPa.

As evident from their physical properties, as detailed above, Sheets #1-3 are advantageous one layered biodegradable sheets according to this invention. Further, as detailed above, although the composition of Sheets #4 and #5 is very similar, they highly differ in their physical properties, particularly in their strain at break. Therefore, it is obviously necessary to perform many experiments in order reach the desired physical properties.

Example 2

Three-Layered Biodegradable Sheets

All of the three layered sheets related to herein were 100 microns thick.

Sheet #6: A three layered biodegradable sheet was prepared according to the procedure described above for Sheet #1, wherein the weight of each layer constitutes a third of the weight of the final sheet. The three layered Sheet #6 consists of the following three layers:
  Layer 1: 33.3% w/w PLA, 33.3% w/w PBS and 33.3% w/w Ecoflex
  Layer 2: 100% w/w PHA
  Layer 3: 33.3% w/w PLA, 33.3% w/w PBS and 33.3% w/w Ecoflex The measured physical properties of Sheet #6 were as follows: Stress at Maximum Load was 20 MPa, the Strain at Break was 558% and Young's Modulus was 675 MPa.

Sheet #7: A three layered biodegradable sheet was prepared according to the procedure described above for Sheet #1, wherein the weight of each layer constitutes a third of the weight of the final sheet. The three layered Sheet #7 consists of the following three layers:
  Layer 1: 33.3% w/w PLA, 33.3% w/w PBSA and 33.3% w/w PBAT
  Layer 2: 100% w/w PBAT
  Layer 3: 33.3% w/w PLA, 33.3% w/w PBSA and 33.3% w/w PBAT The measured physical properties of Sheet #7 were as follows: Stress at Maximum Load was 30 MPa, the Strain at Break was 618% and Young's Modulus was 391 MPa.

Sheet #8: A three layered biodegradable sheet was prepared according to the procedure described above for Sheet #1, wherein the weight of each layer constitutes a third of the weight of the final sheet. The three layered Sheet #8 consists of the following three layers:
  Layer 1: 100% w/w PBS
  Layer 2: 60% w/w PLA and 40% w/w PBS
  Layer 3: 100% w/w PBS The measured physical properties of Sheet #8 were as follows: Stress at Maximum Load was 44 MPa, the Strain at Break was 4.1% and Young's Modulus was 1374 MPa.

Sheet #9: A three layered biodegradable sheet was prepared according to the procedure described above for Sheet #1, wherein the weight of each layer constitutes a third of the weight of the final sheet. The three layered Sheet #9 consists of the following three layers:
  Layer 1: 100% w/w Ecoflex
  Layer 2: 50% w/w PLA and 50% w/w PBAT
  Layer 3: 100% w/w Ecoflex The measured physical properties of Sheet #9 were as follows: Stress at Maximum Load was 38 MPa, the Strain at Break was 559% and Young's Modulus was 837 MPa.

As evident from their physical properties, as detailed above, Sheets #6-7 are advantageous three layered biodegradable sheets according to this invention.

In all of the above sheets, layer 2 is sandwiched between layers 1 and 3 so that layers 1 and 3 are on the outside of the three layered biodegradable sheet and have contact with the outside atmosphere and layer 2 is positions between them so that it does not contact the outside atmosphere.

Example 3

Biodegradable Polymeric Sheet Comprising about 15-25% w/w PLA and about 75-85% w/w PBSA A composition comprising about 15-25% w/w PLA and about 75-85% w/w PBSA was found to have a profile that was superior to that of other compositions that comprised different percentages of PLA and PBSA, as detailed below.

Rheologically, a composition comprising about 15-25% w/w PLA and about 75-85% w/w PBSA, demonstrated improved melt strength, at relatively lower processing temperatures. For PBSA itself, a low processing temperature is required, to maintain moderate melt strength. On the other hand, for PLA, high processing temperature is required to obtain homogenous melt, and as a consequence, higher thermal degradation, alongside with poor melt strength.

Figure 8:
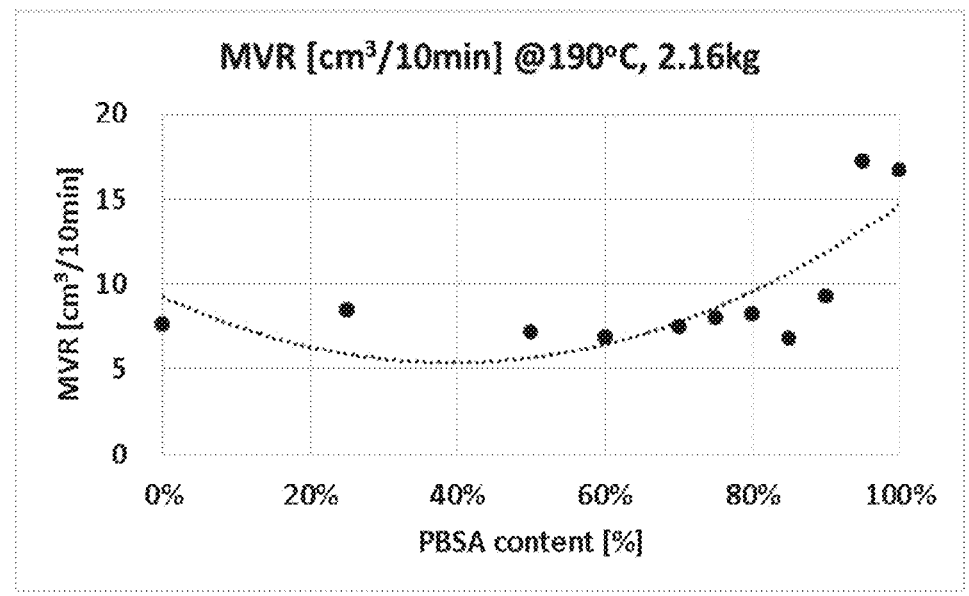
FIG. 8 presents the Melt Volume-Flow Rates (MVR) of various PBSA/PLA compounds. The x-axis is the weight percentage of the PBSA, and the PLA weight percentage is its summation to 100%.

As presented in Table 1 and FIG. 8, the PBSA/PLA compound, starting from 10% w/w PLA with 90% w/w PBSA, demonstrated sufficient Melt Volume-Flow Rate (MVR). MVR is a measure of the ease of flow of the melt of a thermoplastic polymer and the desired range for film extrusion is 4-10 [cm/10 min]. It is defined as the volume of polymer, in $cm^3$, flowing in ten minutes through a capillary of a specific diameter and length by a pressure applied via prescribed alternative gravimetric weights for alternative prescribed temperatures. Lower MVR allows easier polymer film extrusion. In cases wherein the MVR is too low, however, a higher processing temperature is required.

TABLE 1

The MVR of different PBSA/PLA compounds. The analysis was conducted according to ASTM D1238 Melt Flow Rates of Thermoplastics by Extrusion Plastometer.

| No. | Material composition | PLA [%] | PBSA [%] | MVR [$cm^3$/10 min] @ 190° C., 2.16 kg |
|---|---|---|---|---|
| 1 | 100% PBSA | 0% | 100% | 16.7 |
| 2 | 95% PBSA + 5% PLA | 5% | 95% | 17.2 |
| 3 | 90% PBSA + 10% PLA | 10% | 90% | 9.3 |
| 4 | 85% PBSA + 15% PLA | 15% | 85% | 6.8 |
| 5 | 80% PBSA + 20% PLA | 20% | 80% | 8.2 |
| 6 | 75% PBSA + 25% PLA | 25% | 75% | 8.0 |
| 7 | 70% PBSA + 30% PLA | 30% | 70% | 7.5 |
| 8 | 60% PBSA + 40% PLA | 40% | 60% | 6.9 |
| 9 | 50% PBSA + 50% PLA | 50% | 50% | 7.2 |
| 10 | 25% PBSA + 75% PLA | 75% | 25% | 8.4 |

TABLE 1-continued

The MVR of different PBSA/PLA compounds. The analysis was conducted according to ASTM D1238 Melt Flow Rates of Thermoplastics by Extrusion Plastometer.

| No. | Material composition | PLA [%] | PBSA [%] | MVR [$cm^3$/10 min] @ 190° C., 2.16 kg |
|---|---|---|---|---|
| 11 | 100% PLA | 100% | 0% | 7.6 |

Figure 9:
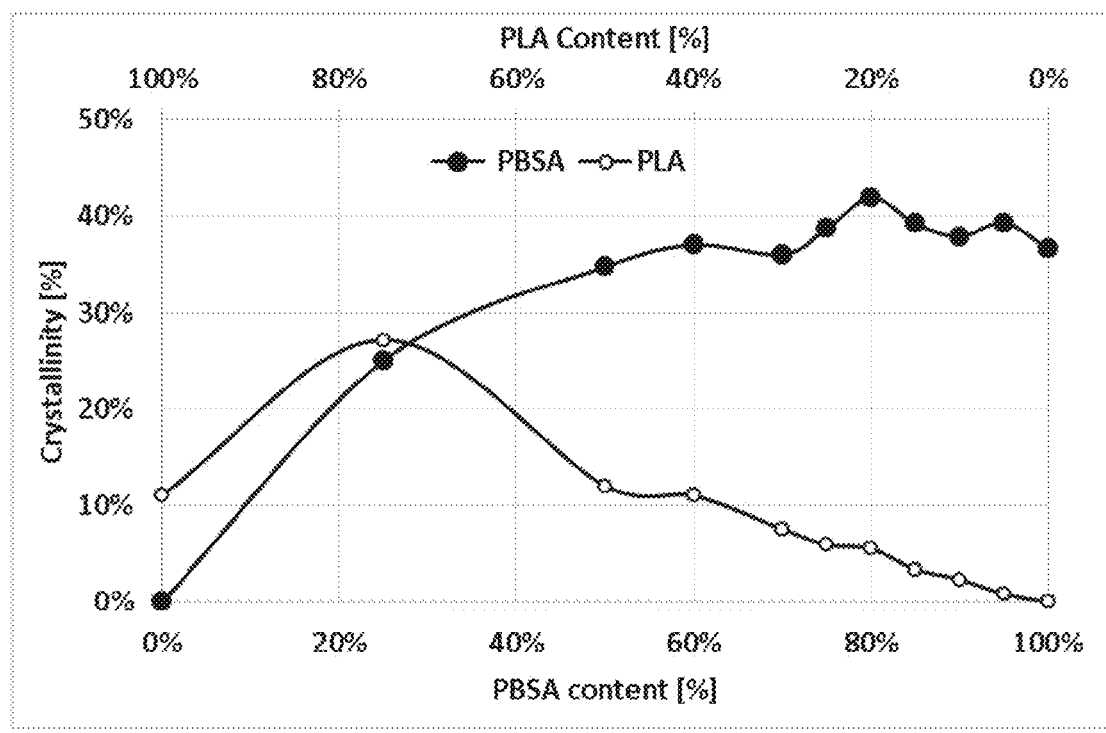
FIG. 9 presents the crystallinity of PBSA and PLA as a function of PLA/PBSA content.
Figure 10:
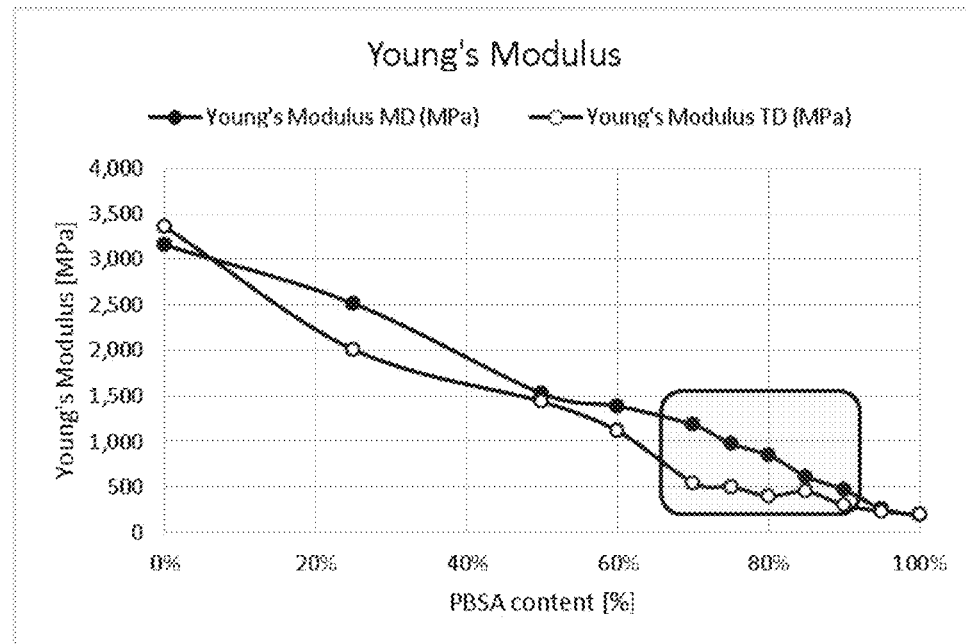
FIG. 10 presents the Young's modulus of various PBSA/PLA compounds. The x-axis is the weight percentage of the PBSA, and the PLA weight percentage is its summation to 100%. Each sample's results refer to machine direction (MD) and trans-machine direction (TD) properties. Note the square area between 400 to 1200 MPa, indicating the desired range.
Figure 11:
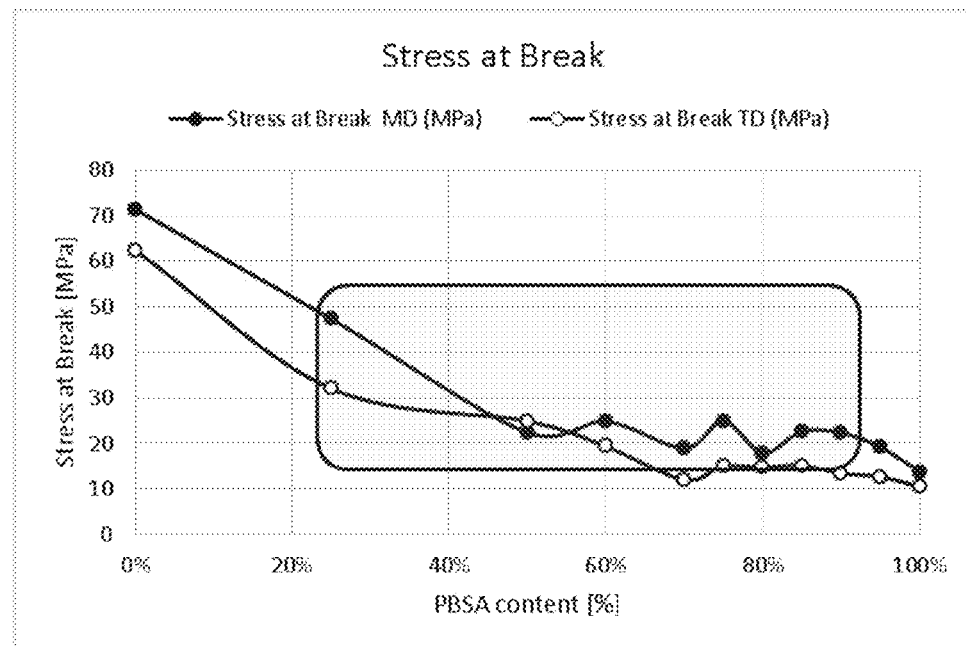
FIG. 11 presents the stress at break of various PBSA/PLA compounds. The x-axis is the weight percentage of the PBSA, and the PLA weight percentage is its summation to 100%. Note the square area between 15 to 40 MPa indicating the desired range.
Figure 12:
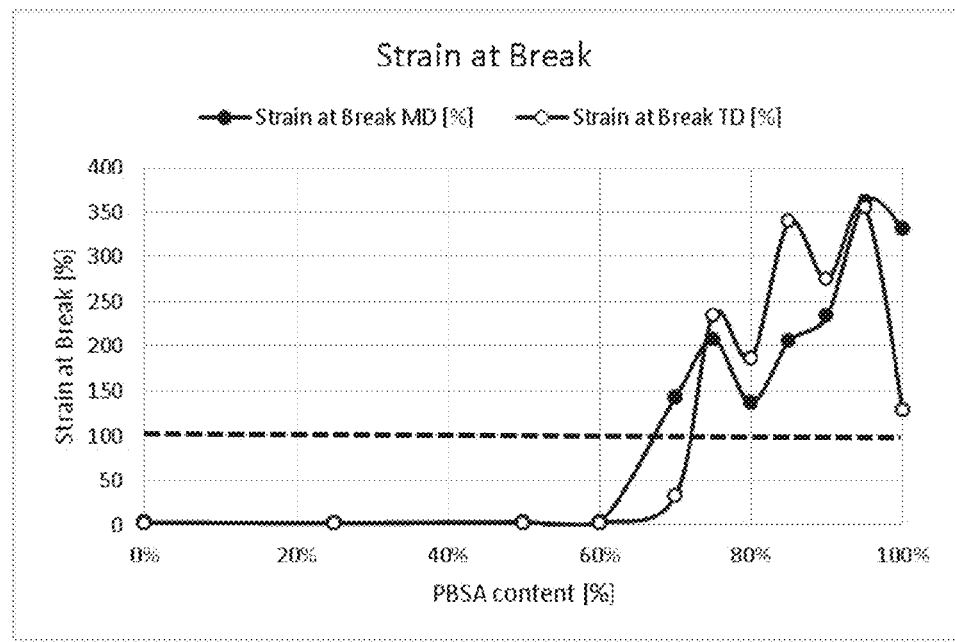
FIG. 12 presents the strain at break of various PBSA/PLA compounds. The x-axis is the weight percentage of the PBSA, and the PLA weight percentage is its summation to 100%. Note the border line of above 100% strain indicating the required strain level.
Figure 13:
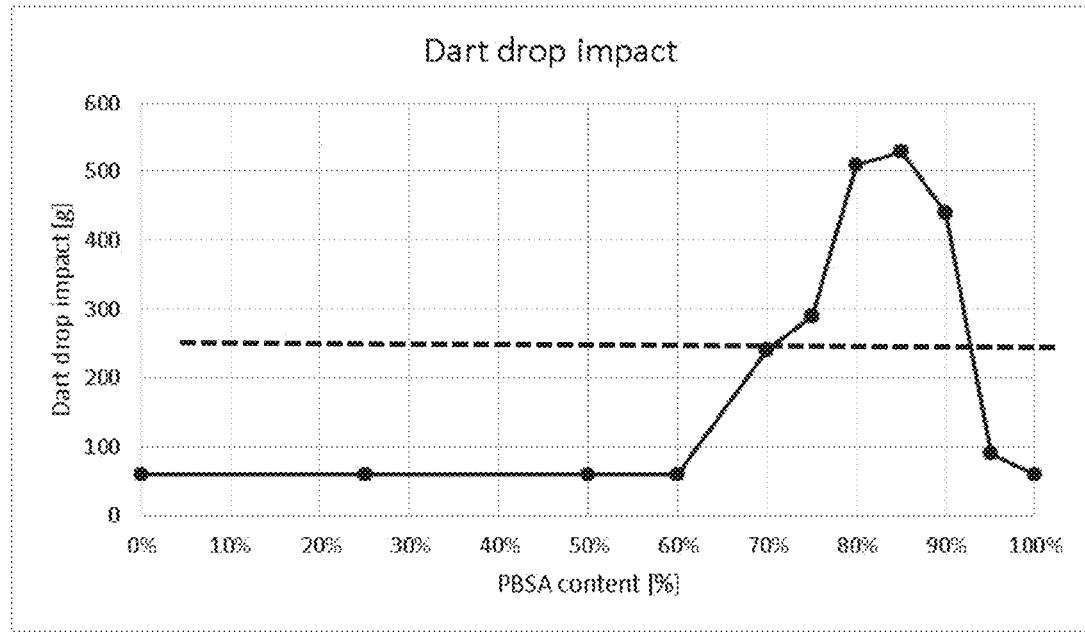
FIG. 13 presents the dart drop impact of different PBSA/PLA compounds. The x-axis is the weight percentage of the PBSA, and the PLA weight percentage is its summation to 100%. Note the borderline of above 250 g indicating the desired dart drop impact level.

As presented in Table 2 and FIG. 9, the crystallinity of each polymer was analyzed using differential scanning calorimetery (DSC). The melting enthalpy ($\Delta Hm$) was used to calculate the relative crystallinity of each polymer (% crystallinity) at its melting temperature (Tm). The analysis was performed according to ASTM D3418—Transition Temperatures and Enthalpies of Fusion and Crystallization of Polymers by Differential Scanning Calorimetry (DSC). The optimal crystallinity of these compounds was obtained between 5/95% w, w to 25/75% w/w PLA/PBSA.

TABLE 2

Crystallinity of PBSA and PLA of each polymer composition.

| # | | PLA [%] | PBSA [%] | PBSA Crystallinity [%] | PLA Crystallinity [%] |
|---|---|---|---|---|---|
| 1 | 100% PBSA | 0% | 100% | 37% | 0% |
| 2 | 95% PBSA + 5% PLA | 5% | 95% | 39% | 1% |
| 3 | 90% PBSA + 10% PLA | 10% | 90% | 38% | 2% |
| 4 | 85% PBSA + 15% PLA | 15% | 85% | 39% | 3% |
| 5 | 80% PBSA + 20% PLA | 20% | 80% | 42% | 6% |
| 6 | 75% PBSA + 25% PLA | 25% | 75% | 39% | 6% |
| 7 | 70% PBSA + 30% PLA | 30% | 70% | 36% | 8% |
| 8 | 60% PBSA + 40% PLA | 40% | 60% | 37% | 11% |
| 9 | 50% PBSA + 50% PLA | 50% | 50% | 35% | 12% |
| 10 | 95% PBSA + 75% PLA | 75% | 25% | 25% | 27% |
| 11 | 100% PLA | 100% | 0% | 0% | 11% |

In addition, the mechanical properties of these compounds were analyzed. While pure PLA films displayed poor impact resistance, in addition to high tensile modulus, leading to a fragile film and low tensile strain, the PBSA films displayed high impact resistance and high strain, but low tensile modulus. A film of about 15/85% w/w to 25/75% w/w PLA/PBSA, on the other hand, demonstrated high impact resistance and high tensile strain, with high tensile modulus. The data is summarized in Table 3, and FIGS. 10-13.

For flexible films the desired mechanical properties are in the following ranges: Stress at maximum load 15-40 [MPa], strain at break >100[%], tensile modulus of 400-1200 [MPa] and Dart impact failure weight above 250 [grams]. The optimal ranges are highlighted in Table 3, and FIGS. 10-13.

TABLE 3

The mechanical properties of single layered biodegradable sheet comprising PLA and PBSA at a range of relative percentages. These properties were measured using a standard tensile test according to ASTM D882 Tensile Properties of Thin Plastic Sheeting, and ASTM D1709 Impact Resistance of Plastic Film by the Free-Falling Dart method.

| No. | Material composition Desired value | PLA [%] | PBSA [%] | Thickness [microns] | Young's Modulus MD (MPa) between 400 to 1200 MPa | Young's Modulus TD (MPa) | Stress at Break MD (MPa) between 15-40 MPa | Stress at Break TD (MPa) | Strain at Break MD [%] above 100% | Strain at Break TD [%] | Dart drop impact [g] above 250 g |
|---|---|---|---|---|---|---|---|---|---|---|---|
| 1 | 100% PBSA | 0% | 100% | 45 | 186 | 197 | 14 | 10 | 332 | 129 | 60 |
| 2 | 95% PBSA + 5% PLA | 5% | 95% | 36 | 264 | 237 | 19 | 13 | 362 | 356 | 90 |

TABLE 3-continued

The mechanical properties of single layered biodegradable sheet comprising PLA and PBSA at a range of relative percentages. These properties were measured using a standard tensile test according to ASTM D882 Tensile Properties of Thin Plastic Sheeting, and ASTM D1709 Impact Resistance of Plastic Film by the Free-Falling Dart method.

| No. | Material composition Desired value | PLA [%] | PBSA [%] | Thickness [microns] | Young's Modulus MD (MPa) between 400 to 1200 MPa | Young's Modulus TD (MPa) | Stress at Break MD (MPa) between 15-40 MPa | Stress at Break TD (MPa) | Strain at Break MD [%] above 100% | Strain at Break TD [%] | Dart drop impact [g] above 250 g |
|---|---|---|---|---|---|---|---|---|---|---|---|
| 3 | 90% PBSA + 10% PLA | 10% | 90% | 45 | 471 | 301 | 22 | 13 | 234 | 275 | 440 |
| 4 | 85% PBSA + 15% PLA | 15% | 85% | 46 | 615 | 454 | 23 | 15 | 206 | 340 | 530 |
| 5 | 80% PBSA + 20% PLA | 20% | 80% | 46 | 853 | 403 | 18 | 15 | 137 | 187 | 510 |
| 6 | 75% PBSA + 25% PLA | 25% | 75% | 42 | 976 | 505 | 25 | 15 | 207 | 235 | 290 |
| 7 | 70% PBSA + 30% PLA | 30% | 70% | 43 | 1,184 | 547 | 19 | 12 | 143 | 33 | 240 |
| 8 | 60% PBSA + 40% PLA | 40% | 60% | 42 | 1,391 | 1,116 | 25 | 19 | 3 | 3 | 60 |
| 9 | 50% PBSA + 50% PLA | 50% | 50% | 38 | 1,527 | 1,437 | 22 | 25 | 4 | 2 | 60 |
| 10 | 25% PBSA + 75% PLA | 75% | 25% | 35 | 2,516 | 2,008 | 47 | 32 | 3 | 2 | 60 |
| 11 | 100% PLA | 100% | 0% | 47 | 3,157 | 3,357 | 71 | 63 | 3 | 2 | 60 |

The PBSA/PLA compounds were further tested at a wide temperature range for heat sealing. While PBSA films had a limited heat sealing temperature range, at 80° C., and PLA films had a limited heat sealing temperature range of about 100-140° C. the range of compositions from 10/90% w/w to 75/25% PLA/PBSA films had a heat sealing temperature range of 40-50° C. between 80 to 120-130° C. (see Table 4).

TABLE 4

Heat sealing temperature range, of sealing strength of above 10N.

| No. | Material composition | PLA [%] | PBSA [%] | Heat sealing temperature range [C] | Heat sealing range [C] |
|---|---|---|---|---|---|
| 1 | 100% PBSA | 0% | 100% | 80-80 | 0 |
| 2 | 95% PBSA + 5% PLA | 5% | 95% | 80-80 | 0 |
| 3 | 90% PBSA + 10% PLA | 10% | 90% | 80-120 | 40 |
| 4 | 85% PBSA + 15% PLA | 15% | 85% | 80-120 | 40 |
| 5 | 80% PBSA + 20% PLA | 20% | 80% | 80-120 | 40 |
| 6 | 75% PBSA + 25% PLA | 25% | 75% | 80-120 | 40 |
| 7 | 70% PBSA + 30% PLA | 30% | 70% | 80-130 | 50 |
| 8 | 60% PBSA + 40% PLA | 40% | 60% | 80-130 | 50 |
| 9 | 50% PBSA + 50% PLA | 50% | 50% | 80-130 | 50 |
| 10 | 25% PBSA + 75% PLA | 75% | 25% | 80-130 | 50 |
| 11 | 100% PLA | 100% | 0% | 100-140 | 40 |

This effect was demonstrated for a layer comprising about 15-25% w/w PLA and about 85-75% w/w PBSA, displaying improved properties of a single layer film or as a layer of a multi layer film.

In summary, the gathered information in our studies has shown (See overview data in Table 5) that the 15/85% to 25/75% PLA/PBSA films, are highly advantageous, when compared to films prepared with other relative percentages of PLA/PBSA.

TABLE 5

Overview of the outcome measures for single layered biodegradable sheet comprising PLA and PBSA at range of compositional ratios.

| No. | Material composition Desired value | PLA [%] | PBSA [%] | MVR [cm³/10 min] @ 190° C., 2.16 kg | Thickness [microns] | Young's Modulus MD (MPa) between 400 to 1200 MPa | Young's Modulus TD (MPa) | Stress at Break MD (MPa) between 15-40 MPa | Stress at Break TD (MPa) |
|---|---|---|---|---|---|---|---|---|---|
| 1 | 100% PBSA | 0% | 100% | 16.7 | 45 | 186 | 197 | 14 | 10 |
| 2 | 95% PBSA + 5% PLA | 5% | 95% | 17.2 | 36 | 264 | 237 | 19 | 13 |
| 3 | 90% PBSA + 10% PLA | 10% | 90% | 9.3 | 45 | 471 | 301 | 22 | 13 |
| 4 | 85% PBSA + 15% PLA | 15% | 85% | 6.8 | 46 | 615 | 454 | 23 | 15 |
| 5 | 80% PBSA + 20% PLA | 20% | 80% | 8.2 | 46 | 853 | 403 | 18 | 15 |

TABLE 5-continued

Overview of the outcome measures for single layered biodegradable sheet comprising PLA and PBSA at range of compositional ratios.

| No. | Material composition Desired value | PLA [%] | PBSA [%] | | | | | | |
|---|---|---|---|---|---|---|---|---|---|
| 6 | 75% PBSA + 25% PLA | 25% | 75% | 8.0 | 42 | 976 | 505 | 25 | 15 |
| 7 | 70% PBSA + 30% PLA | 30% | 70% | 7.5 | 43 | 1,184 | 547 | 19 | 12 |
| 8 | 60% PBSA + 40% PLA | 40% | 60% | 6.9 | 42 | 1,391 | 1,116 | 25 | 19 |
| 9 | 50% PBSA + 50% PLA | 50% | 50% | 7.2 | 38 | 1,527 | 1,437 | 22 | 25 |
| 10 | 25% PBSA + 75% PLA | 75% | 25% | 8.4 | 35 | 2,516 | 2,008 | 47 | 32 |
| 11 | 100% PLA | 100% | 0% | 7.6 | 47 | 3,157 | 3,357 | 71 | 63 |

| No. | Material composition Desired value | PLA [%] | PBSA [%] | Strain at Break MD [%] above 100% | Strain at Break TD [%] | Dart drop impact [g] above 250 g | Heat sealing temperature range [C] | range [C] | PBSA Crystallinity [%] (DSC) | PLA Crystallinity [%] (DSC) |
|---|---|---|---|---|---|---|---|---|---|---|
| 1 | 100% PBSA | 0% | 100% | 332 | 129 | 60 | 80-80 | 0 | 37% | 0% |
| 2 | 95% PBSA + 5% PLA | 5% | 95% | 362 | 356 | 90 | 80-80 | 0 | 39% | 1% |
| 3 | 90% PBSA + 10% PLA | 10% | 90% | 234 | 275 | 440 | 80-120 | 40 | 38% | 2% |
| 4 | 85% PBSA + 15% PLA | 15% | 85% | 206 | 340 | 530 | 80-120 | 40 | 39% | 3% |
| 5 | 80% PBSA + 20% PLA | 20% | 80% | 137 | 187 | 510 | 80-120 | 40 | 42% | 6% |
| 6 | 75% PBSA + 25% PLA | 25% | 75% | 207 | 235 | 290 | 80-120 | 40 | 39% | 6% |
| 7 | 70% PBSA + 30% PLA | 30% | 70% | 143 | 33 | 240 | 80-130 | 50 | 36% | 8% |
| 8 | 60% PBSA + 40% PLA | 40% | 60% | 3 | 3 | 60 | 80-130 | 50 | 37% | 11% |
| 9 | 50% PBSA + 50% PLA | 50% | 50% | 4 | 2 | 60 | 80-130 | 50 | 35% | 12% |
| 10 | 25% PBSA + 75% PLA | 75% | 25% | 3 | 2 | 60 | 80-130 | 50 | 25% | 27% |
| 11 | 100% PLA | 100% | 0% | 3 | 2 | 60 | 100-140 | 40 | 0% | 11% |

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A biodegradable polymeric sheet, wherein the sheet is a multilayer sheet including at least one layer consisting of about 15-25% w/w PLA and about 75-85% w/w PBSA, and wherein the sheet has light transmittance in the range of 75-95%.

2. The biodegradable polymeric sheet according to claim 1, wherein said at least one layer consisting of about 15-25% w/w PLA and about 75-85% w/w PBSA comprises about 15% w/w PLA and about 85% w/w PBSA.

3. The biodegradable polymeric sheet according to claim 1, wherein said at least one layer consisting of about 15-25% w/w PLA and about 75-85% w/w PBSA comprises about 20% w/w PLA and about 80% w/w PBSA.

4. The biodegradable polymeric sheet according to claim 1, wherein said at least one layer consisting of about 15-25% w/w PLA and about 75-85% w/w PBSA comprises about 25% w/w PLA and about 75% w/w PBSA.

5. The biodegradable polymeric sheet according to claim 1, said multilayer sheet including at least three layers, wherein said at least one layer consisting of about 15-25% w/w PLA and about 75-85% WAN PBSA is an internal layer of said at least three layers.

6. The biodegradable polymeric sheet according to claim 1, wherein said at least one layer consisting of about 15-25% WAN PLA and about 75-85% w/w PBSA is an external layer.

7. A receptacle comprising the biodegradable polymeric sheet according claim 1.

8. A receptacle comprising the biodegradable polymeric sheet according to claim 5.

9. A receptacle comprising the biodegradable polymeric sheet according to claim 6.

10. The receptacle according to claim 9, wherein said at least one layer consisting of about 15-25% w/w PLA and about 75-85% w/w PBSA is at least one inner layer and at least one outer layer.

* * * * *